Nov. 6, 1962    M. FRANÇOIS    3,062,391
MACHINE FOR SORTING OUT LETTERS AND OTHER DOCUMENTS
Filed June 10, 1959    12 Sheets-Sheet 1
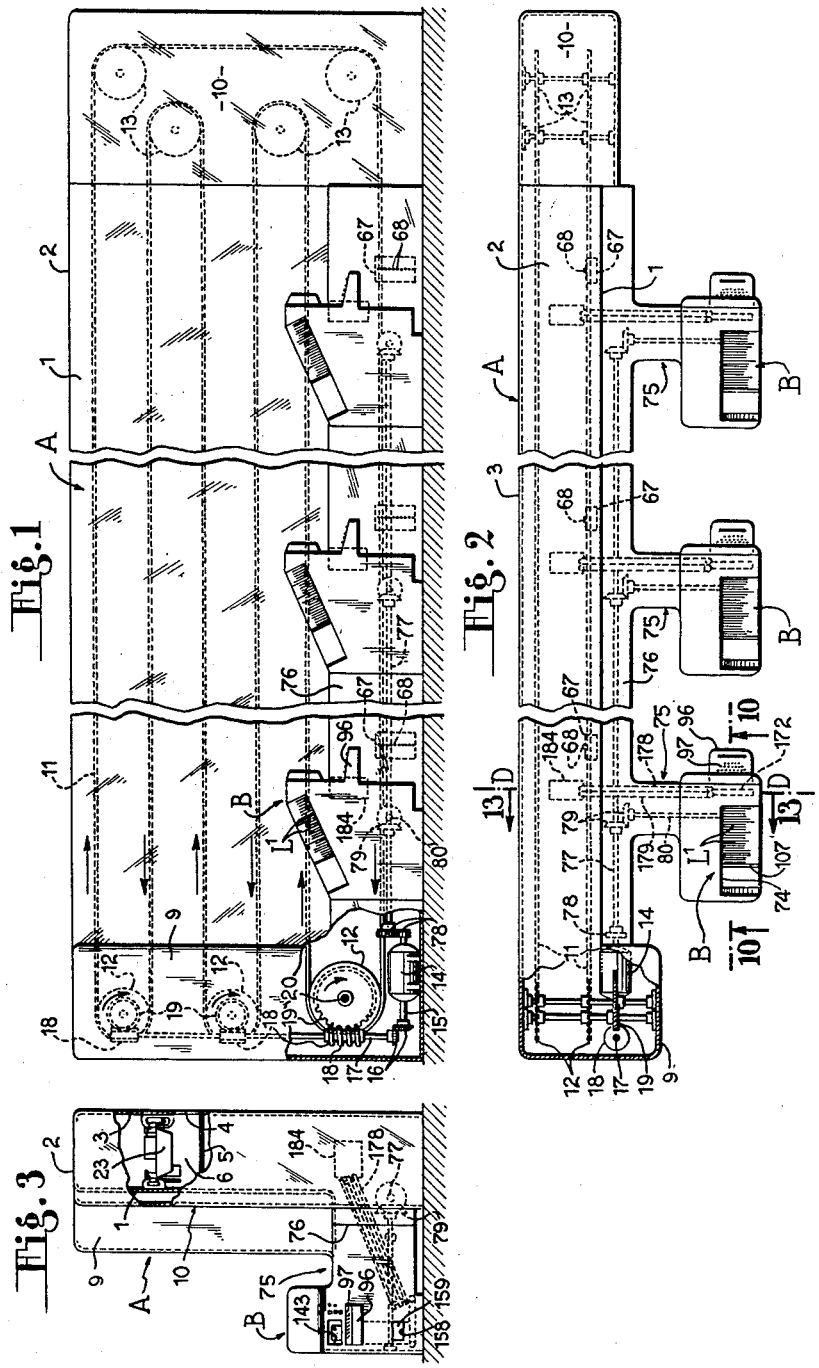

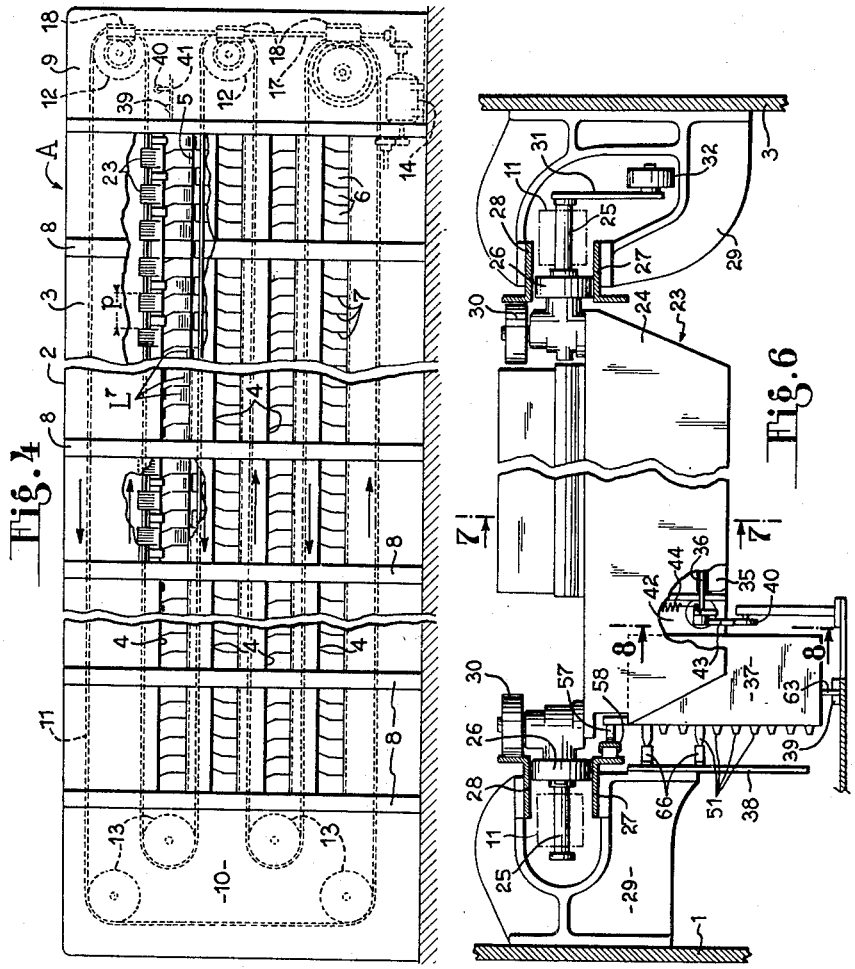

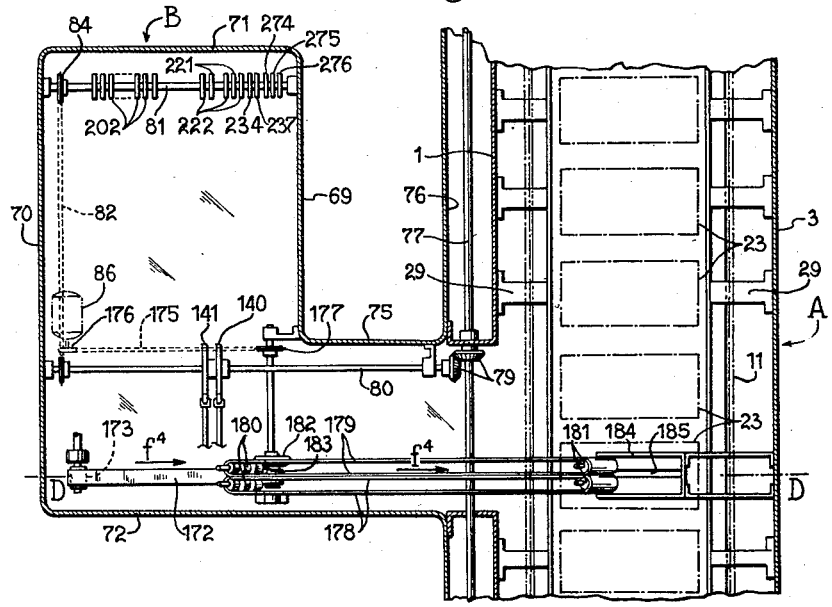
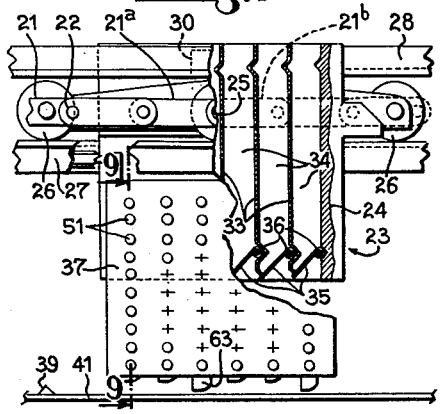
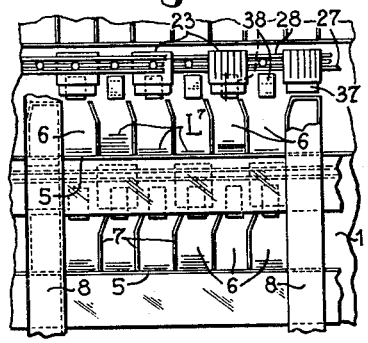

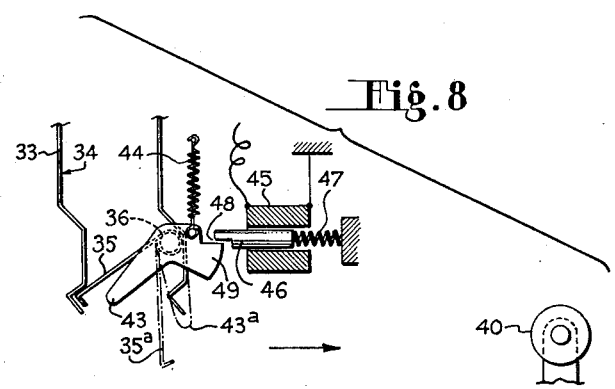
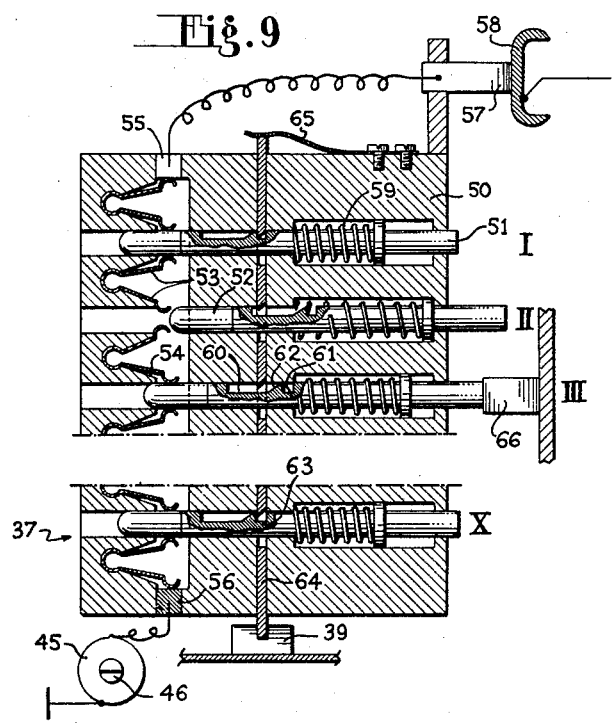

Nov. 6, 1962  M. FRANCOIS  3,062,391
MACHINE FOR SORTING OUT LETTERS AND OTHER DOCUMENTS
Filed June 10, 1959  12 Sheets-Sheet 5
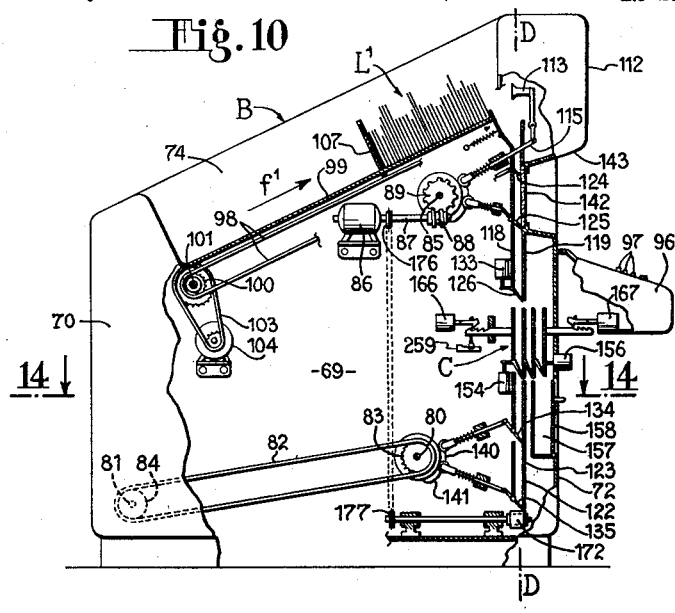
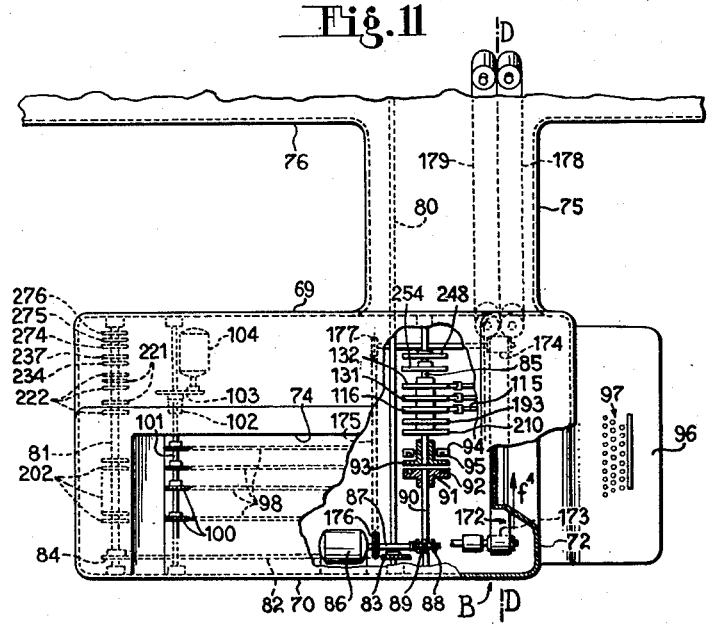

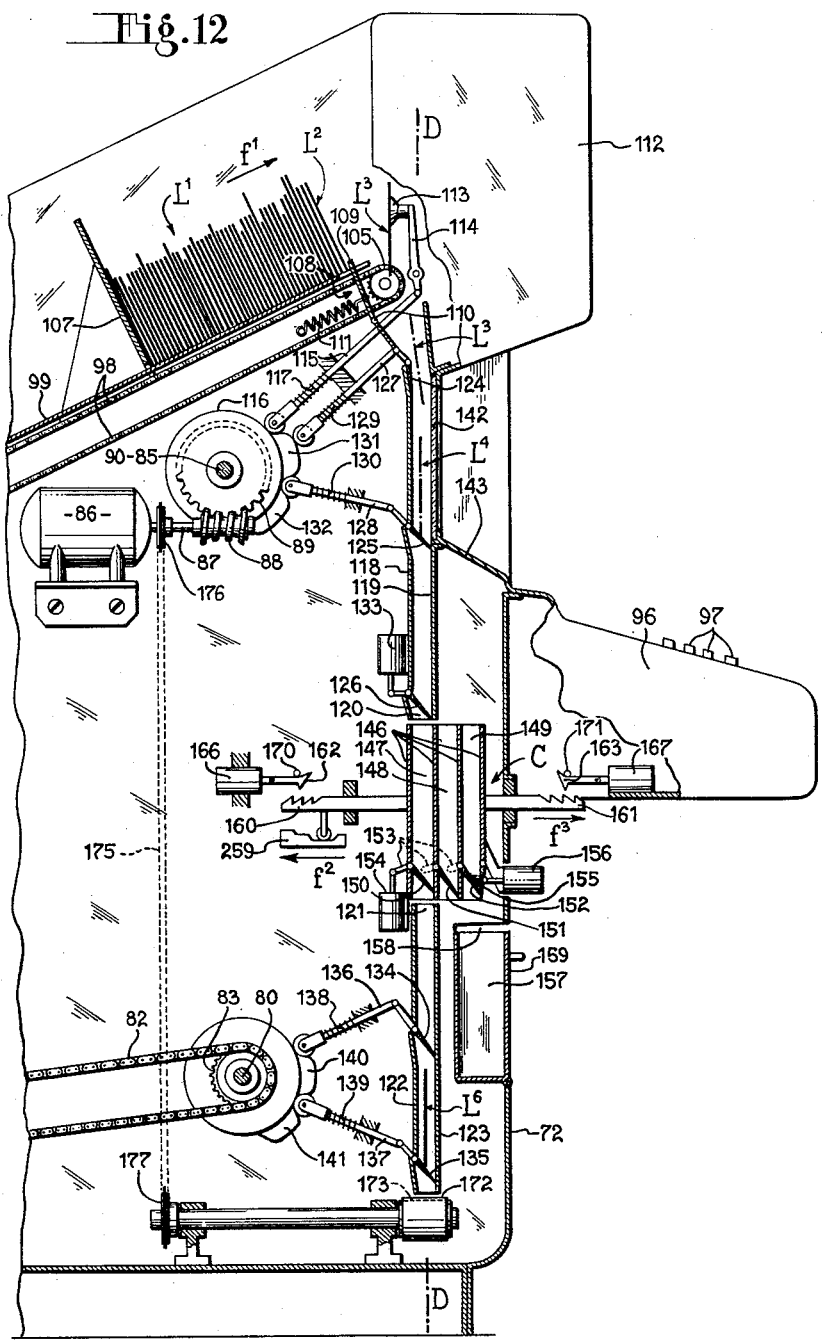

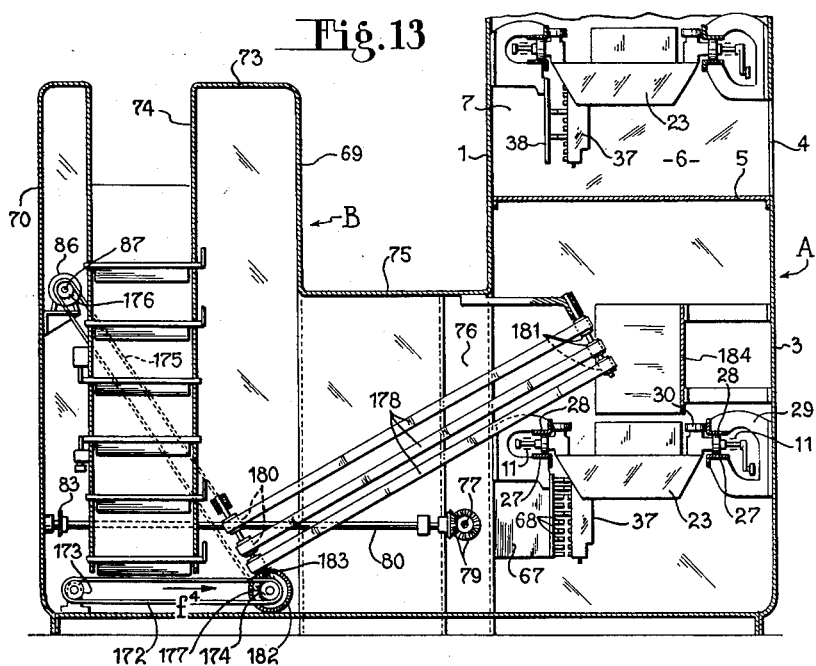

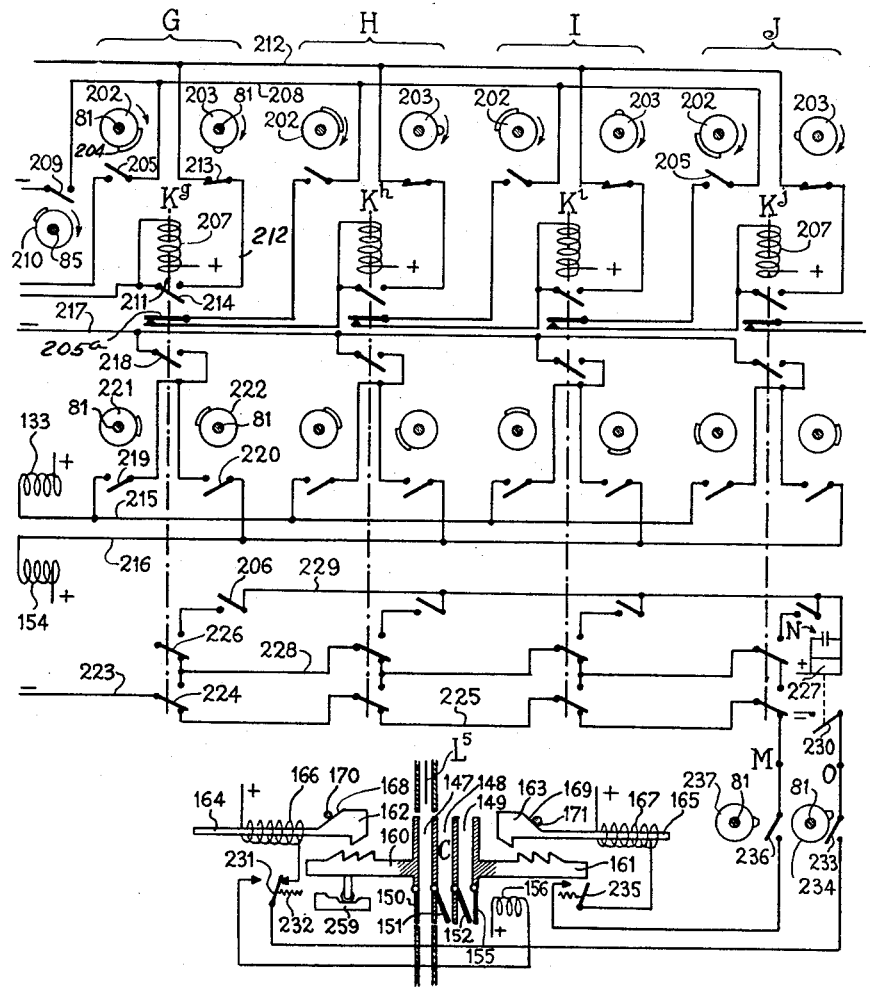
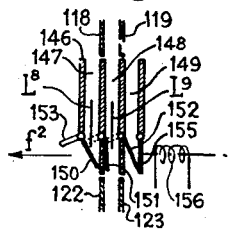
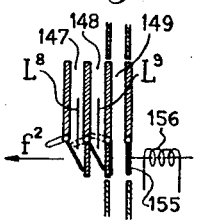
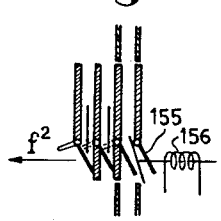

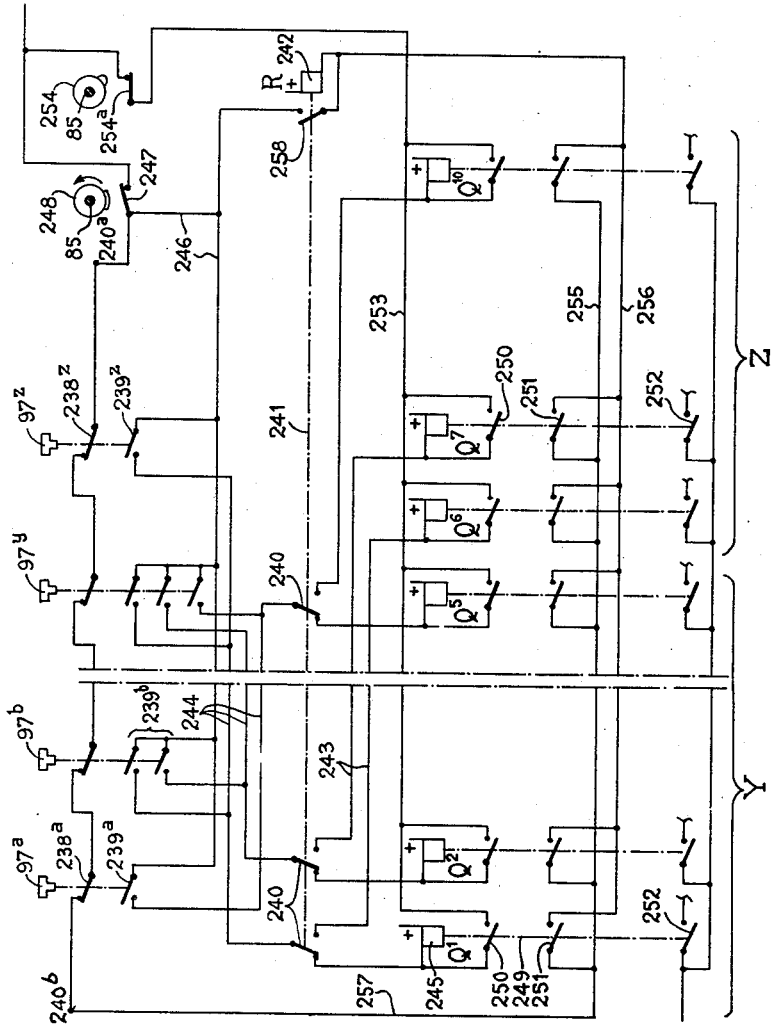

Nov. 6, 1962 M. FRANCOIS 3,062,391
MACHINE FOR SORTING OUT LETTERS AND OTHER DOCUMENTS
Filed June 10, 1959 12 Sheets-Sheet 12

United States Patent Office 3,062,391
Patented Nov. 6, 1962

3,062,391
MACHINE FOR SORTING OUT LETTERS
AND OTHER DOCUMENTS
Marcel François, Chatenay-Malabry, France, assignor to Hotchkiss-Brandt, Paris, France, a corporation of France
Filed June 10, 1959, Ser. No. 819,328
Claims priority, application France June 13, 1958
16 Claims. (Cl. 214—11)

The present invention relates to machines for sorting out letters, or any other documents which are similar to letters as to their shape, according to their destination or any other criterion.

For ease and clarity of description, reference will be made hereinafter only to letters, this term being intended to embrace in a general manner any document to be sorted out.

A type of machine is known for sorting out letters which are supplied in any order to at least one station provided with an operator who reads the addresses one by one. This operator has at his disposal a keyboard whereby, on the one hand, he causes each letter to fall into one of a series of moving conveying pockets each of which is provided with an index means, and, on the other hand, he establishes, in accordance with a predetermined code which is a function of the sorting out to be effected, and through the medium of a fixed indexing device in front of which the index means of the pockets pass, an indexing or coding of each pocket as a function of the destination of the letter received by this pocket, whereby the pockets, in thereafter passing in front of fixed containers each of which pertains to a given destination, release the letters in the required containers in accordance with the established individual indexing or coding.

In known machines of this type, the movement of the pockets is related to the more or less variable rhythm or rate of work of the operator or operators and is therefore essentially irregular; the machine has therefore a relatively low output.

The object of the invention is to provide an improved machine of the aforementioned type for sorting out letters and other documents similar to letters as to their shapes and a certain rigidity enabling them to stand upright on one of their edges, this machine remedying the disadvantages of known machines and in particular considerably increasing the normal rate of work, which rate could for one operator attain and even exceed 4,000 letters or documents per hour.

This is made possible by the fact that the improved machine comprises in combination: a single endless distributing conveyor to which is imparted a continuous uniform movement in the course of which it passes by each operator station and on which are mounted cups each of which is provided for the individual conveyance of a document to be sorted out, a device located at each operator station for regulating the feed of the documents to said cups so as to conciliate the arrhythmic rate of the operations effected by the operator with the continuous and uniform movement of the conveyor by temporarily storing or holding back at least one document from the sorting out circuit if the arrhythmic rate of the operator is momentarily higher than his normal rate and, inversely, by restoring said document to the sorting out circuit as soon as the rate of the operator drops below said normal rate, and means constituting a memory for storing and then restoring the value of the code emitted by the operator for said document so as to index the cup which subsequently receives said document after its restoration to the sorting out circuit.

Further features and advantages of the invention will be apparent from the ensuing description with reference to the accompanying drawings to which the invention is in no way limited.

In the drawings:

FIG. 1 is a diagrammatic front elevational view, with a part cut away, of a machine for sorting out letters or other documents improved in accordance with the invention, this machine having a plurality of stations each of which is controlled by one operator;

FIG. 2 is a corresponding plan view of the machine;

FIG. 3 is an end elevational view of the machine with a part cut away;

FIG. 4 is a rear elevational view of the machine;

FIG. 5 is a partial view of the machine on an enlarged scale;

FIG. 6 is a view of the carriage, forming a plurality of cups each of which pertains to one of the operators, and supports for this carriage;

FIG. 7 is a lateral view of the carriage with a partial sectional view taken along line 7—7 of FIG. 6;

FIG. 8 is a partial sectional view on an enlarged scale of one of the carriages taken along line 8—8 of FIG. 6 through the locking device of the pivoting bottom of one of the cups;

FIG. 9 is a vertical sectional view taken along line 9—9 of FIG. 7, on an enlarged scale, of the part of the index means corresponding to one of the cups of one of the carriages;

FIG. 10 is a vertical diagrammatic sectional view taken along line 10—10 of FIG. 2, on an enlarged scale, of one of the operator stations;

FIG. 11 is a plan view, with parts cut away, of the station shown in FIG. 10;

FIG. 12 is a vertical sectional view on an enlarged scale of a part of FIG. 10;

FIG. 13 is a diagrammatic vertical sectional view, taken along line 13—13 of FIG. 2 on the same scale as FIGS. 10 and 11 of the whole of the lower part of the machine;

FIG. 14 is a horizontal sectional view taken along line 14—14 of FIG. 10;

FIG. 16 is a diagram of the electrical connections relating to the possible regulation of the feed of the letters by a temporary storage thereof;

FIGS. 17, 18 and 19 show three successive positions of the letter storing device;

FIG. 20 is a diagram of the electrical connections in an operator station relating to the conversion into electromagnetic form of the code tapped out by the operator on the keyboard;

Figure 15:
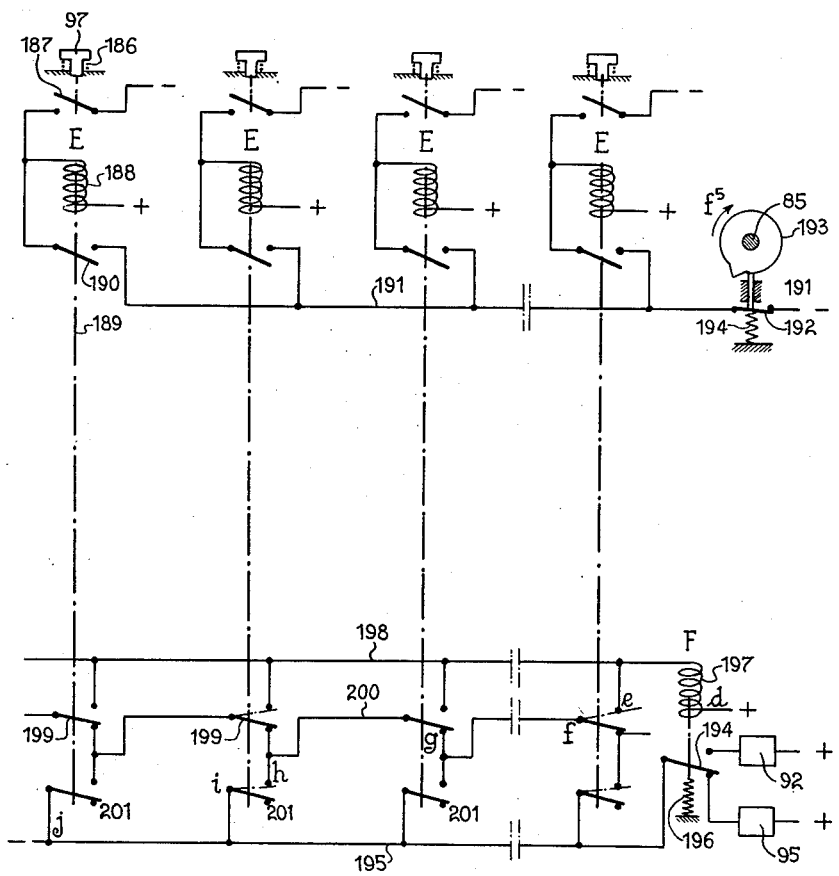
FIG. 15 is a diagram of the control circuits of the relays of the coding keys and of the arrhythmic cycle rotary shaft of one of the operator stations.

GENERAL DESCRIPTION OF THE MACHINE
SHOWN IN FIGS. 1-20

According to this embodiment, the machine consists of (FIGS. 1-3) a large filing cabinet A, in which the letters or other documents must be filed in accordance with their destinations, and, on the front side of this cabinet, operator stations B at each of which is stationed an operator who receives at $L^1$ (FIGS. 1, 2 and 10) stacks of letters assembled with no regard to their destination. The operator reads off the destination or address of each letter and, by a manual operation which is accomplished rapidly but more or less arrhythmically, directs them to the cabinet A where they are filed or classified at $L^7$ (FIG. 4) according to their destinations.

A detailed description will now be given of the filing cabinet A, of an operator station B and of the various electromagnetic devices pertaining to this station.

*(a) Cabinet A and the Equipment Therein (FIGS. 1–9)*

This cabinet has a rectangular-sided box shape and comprises a front wall 1, a top wall 2 and a rear wall 3. The walls 1 and 2 could be non-apertured walls. The rear wall 3 is open in that it comprises four large longitudinally extending horizontal openings 4 each of which gives access to the top side of a shelf 5 and to the compartments 6 provided on these shelves. There are therefore four superimposed rows of compartments 6.

Each of these compartments has such width, in the longitudinal direction of the machine, as to be capable of receiving, successively and flat on top of each other, the letters $L^7$ (FIG. 4) which have a common destination. The compartments are defined on the front side of the cabinet by the wall 1 and are separated from each other by vertical transverse common partitions 7 (FIGS. 4 and 5). The upper portions of these partitions are preferably inclined or curved in the same direction in each row, the inclinations being in opposite directions from one row to the next. The compartments are fully open at the rear of the cabinet so as to permit an easy manual extraction of the piles of letters $L^7$ which were deposited therein in the course of sorting out.

The component walls of the cabinet A are, of course, reinforced by, for example, section steels in the form of uprights, longitudinal members, cross-members and stiffening members. These various reinforcing members have not been shown in the drawings except for the rear uprights 8 provided against the rear wall 3 (FIGS. 4 and 5).

At both ends the cabinet A is extended by two vertical cases 9 and 10.

Movable within the cabinet A is an endless conveyor having cups for conveying the letters from the stations B and depositing them in the compartments 6. This conveyor comprises two chains 11 which are disposed in parallel in such manner that each has six longitudinally extending portions (FIGS. 1 and 4), this being obtained by passing these chains, on the one hand, round three pairs of driving wheels or sprockets 12 disposed in the case 9, and, on the other hand, round four pairs of return wheels or sprockets 13 located in the case 10. The sprockets 12 are driven by an electric motor 14 (FIGS. 1 and 2) whose shaft 15 has one end connected by a pair of bevel gears 16 to a vertical shaft 17. Keyed on the latter are three worms 18 which mesh with three worm wheels 19, each of which is keyed on the shaft 20 of one of the pairs of sprockets 12. The latter rotate in a clockwise direction (as viewed in FIG. 1) so that the five longitudinally extending portions of the chains between the sprockets move in the directions indicated by the arrows in FIGS. 1 and 4. The lowest portions of the two chains move in synchronism from the right toward the left substantially at the same level as the lower part of the operator station B, whereas the next upper portions of the two chains, which constitute the return portions, move in the opposite direction, the movement of the intermediate portions alternately changing in direction. It is these four intermediate portions which are adapted to convey the letters to the compartments 6 of the filing cabinet, each portion moving in a plane located a certain distance above the upper ends of these compartments.

It will be observed that for each row, the partitions 7 defining each compartment are deflected in the direction opposed to the direction of movement of the portion of each chain pertaining to the compartments of this row, that is, toward the left for the top row (as viewed in FIG. 4), toward the right for the next lower row and so on.

The two chains 11 of the conveyor have links 21 (FIG. 7) articulated together by pins 22, and these two chains carry the active elements of the conveyor, namely, carriages disposed equal distances apart from one another.

Each carriage, generally designated by the reference numeral 23, comprises (FIGS. 6 and 7) a hollow body 24 which has a vertical throughway aperture and is provided with two coaxial journals 25 which also constitute connecting pins for two adjacent links 21$^a$ and 21$^b$ of each chain instead of the usual pins 22. The carriage is therefore pivotably suspended from the two chains and it consequently remains horizontal in the vertically extending portions and in the portions of the chains extending round the sprockets 12 and 13.

Each carriage carries four guide rollers 26 adapted to roll between two pairs of rails 27, 28 which are carried by supports 29 fixed to the walls 1 and 3 of the cabinet and to their frame (FIGS. 6, 7, and 13), these rails being disposed in such manner as to follow the zigzag path of the two chains 11. Further, the carriages 23 are guided in the transverse direction of the machine by two other rollers 30 having vertical spindles and adapted to roll along the inner facing sides of the two upper rails 28. One end of one of the journals 25 of each carriage carries, at the end of a crank or arm 31 (FIG. 6), a roller 32 adapted to guide the carriage in such manner that the latter remains horizontal when it passes around the sprockets 12 or 13 or passes along the vertically extending portions of the chains 11.

The hollow body 24 of each carriage 23 is provided from bottom to top, as mentioned hereinbefore, with a vertical slot, and the latter is divided by a number of transverse vertical partitions 33 (FIG. 7) into as many vertical cups 34 as there are operator stations B, namely, six in the presently-described embodiment. These cups are shown partially in section in FIG. 7.

Each cup 34 has such length, in the transverse direction of the cabinet, height and width as to be capable of receiving a letter of the largest size it is contemplated to sort out, disposed in a substantially vertical position.

One cup 34 of each carriage 23 is provided for each of the operator stations B in the same order from one carriage to the other; for example, the first cup from the right of each carriage, as this carriage travels along the lower portion of the conveyor, is provided for the first station B starting from the right, the second cup for the second station, and so on.

The distance $p$ (FIG. 4) which separates two cups of two consecutive carriages of the same row is constant throughout the length of the conveyor and constitutes the pitch of the latter.

This pitch $p$ is travelled through in a time T, which constitutes the duration of one cycle of the continuous movement of the machine. Thus, if the output of the machine per operator is 4,000 letters per hour, this duration T is equal to $$\frac{3,600}{4,000} = 0.9 \text{ second}$$

In this case, the cups must succeed one another or, in other words, must advance a distance corresponding to the pitch $p$ in 0.9 second.

Each cup 34 is open at its upper and lower ends, but the lower end can be closed by a pivotable flap 35 (FIGS. 7 and 8) adapted to act as a retractable bottom which permits, in its active position, supporting the letter until the compartment into which the letter must be dropped is reached, the pivoting of the flap 35 to the position 35$^a$ (FIG. 8) permitting this letter to drop into this compartment.

The flap 35 pertaining to each of the cups 34 is rigid, as concerns its pivotal movements, with a shaft 36 journalled in the body 24 at the two ends of the corresponding cup.

Laterally, the carriage 23 carries an index means or unit generally designated by the reference numeral 37.

This index unit 37 is so adapted as to permit a coding of each of the cups 34 so that when the coded unit 37 passes in front of complementary actuating devices 38 (FIGS. 5, 6, 9 and 13) disposed in front of the compartments 6 of the cabinet A, one device 38 being provided per compartment and carried by the wall 1 of the cabinet, the flap 35 of the cup in question is retracted to the position 35ᵃ (FIG. 8) when said cup passes in front of the compartment whose device 38 corresponds to the code recorded for this cup on the index unit 37. Further, the flap 35 is brought back to its operative closing position by the passage of the cup in front of closing devices 39 and 40 (described hereinafter) which are encountered just before the upper return portion of the chains is reached and are mounted on a support 41 carried by the cabinet A.

For example, the arrangement of the unit 37 and its combination with the flaps 35 of the cups 34 and with the decoding devices 39 and 40, could be as shown in FIGS. 6 to 9.

In this diagrammatic example the shaft 36 of each flap has an extension which extends into a recess 42 (FIG. 6) of the carriage body 24 and keyed on this extension is a lever 43 (FIGS. 6 and 8) which pivots with the flap between a closed position shown in full line, corresponding to the closure of the corresponding cup 34, and a position 43ᵃ, shown in dot-dash line and corresponding to a fully-opened position of the cup.

The flap 35 and the lever 43 are biased in a direction to open the corresponding cup by a spring 44, and are held in their closed-up positions by an electromagnet 45 whose core 46 is caused to engage and lock in position an abutment portion 48 of a heel 49 of the lever 43 by the action of a return spring 47 when there is no current in the electromagnet.

The opening of each cup by the retraction of the flap 35 to its position 35ᵃ thus occurs in line with the desired compartment 6 of the cabinet A when there is co-operation between the index unit 37 carried by the carriage and the complementary actuating device 38 pertaining to the desired compartment, the latter depending on the coding effected on the unit 37.

The unit 37 comprises a body 50 fixed to the body 24 of the carriage. Horizontally slidable in this body are as many vertical rows of index rods 51 as the carriage comprises cups or compartments, namely, six in the presently-described embodiment (FIG. 7). There are provided in each row as many rods 51 as there are digits provided for the coding, namely, ten in the presently-described embodiment, which are numbered I to X in FIG. 9 starting from the top.

These rods 51 are of a non-conductive material but are provided at the ends thereof disposed in the block 50, which is of insulating material, with a metal portion 52 adapted to cooperate with the adjacent branches of two contact strips 53 which are bent in the form of a V and are disposed in recesses 54 in the block 50. The two end strips are connected to terminals 55 and 56 carried by the block. The terminal 55 is connected to a brush 57 which is carried by the unit 37 and rubs along a fixed rail 58 which carries current and is supported by the supports 29 rigid with the wall 1 of the cabinet A (FIG. 6). The other terminal 56 is connected to the coil of the electromagnet 45. Thus the latter is excited and the corresponding flap 36 is released and opened by the spring 44, when all the index rods 51 have their metal ends 52 engaged between the V-shaped strips 53 and are consequently all in the position of the rods 51 of the rows I, III or X (FIG. 9).

Each rod 51 is biased toward the right (as viewed in FIG. 9) to the extreme position—shown by that of the row II in which the contact 52—53 is opened—by a spring 59. Further, each rod or index 51 comprises a long recess 60 and a short notch 61 which are interconnected by a ramp 62 and adapted to co-operate with the upper edge of an aperture 63 formed in a locking plate 64 which is slidably mounted in the block 50 and downwardly biased to its operative position by a spring 65.

The notch 61 has such position on the rod that when the plate 63 is engaged in this notch, the rod is held in the contact position (that shown by the rods of rows I and X), whereas the recess 60 permits the rod to move longitudinaly between, on the one hand, the extreme right position (position of the rods in row II) to which it is urged by the spring 59 after unlocking and, on the other hand, an intermediate position (position of the rods of row III) assumed by the rod when the latter encounters a ramp 66 pertaining to the complementary actuating device 38 of the index unit carried by the fixed part of the cabinet A, namely the support 29 (FIG. 6).

The intermediate position, shown by row III, is such that contact is re-established between the conductive portion 52 of the rod and the adjacent branches of the two successive V-shaped conductors 53.

The cup-closing devices 39 and 40 which are carried by the support 41 (FIGS. 6 and 7) and are encountered just before the upper return portion of the chains (FIG. 4) is reached, are constituted by, firstly, a projection 39 forming a cam and adapted to raise all the locking plates 64 so as to allow the unit rods to assume their outer positions (II) in which the circuit of the electromagnet 45 is interrupted and, secondly, a roller 40 which swings the levers rigid with the flaps from the position 43ᵃ to the position 43 in which they are locked by the core 46 and the springs 44 are extended (FIG. 8).

The index units 37 pertaining to the different carriages are combined with indexing devices 67, there being one indexing device per operator station B (FIGS. 1, 2 and 13). Each indexing device is disposed against the front wall 1 of the cabinet A to the right of its corresponding station B, as viewed in FIG. 1.

Each indexing device 67 comprises a vertical row of as many electromagnets 68 as there are rods 51 in each compartment of the carriage, namely, ten in the presently-described embodiment. Each of these electromagnets 68 can be excited in the course of the coding effected by the operator of the corresponding station B and permits, each time it is excited, shifting the rod 51 of the same row of the cup pertaining to the corresponding station B from the outer position, such as the position II (FIG. 9), to the fully retracted position, such as the position I or X.

It can be seen that after the conjugate cup-closing devices 39 and 40 have been encountered, that is, while each cup and its carriage travel along the upper return portion of the conveyor and that fraction of the lower portion of the conveyor encountered just before the corresponding operator station B or, more precisely, the corresponding indexing device 67, the index rods 51 pertaining to the coding of this cup are in their outer position corresponding to row II (FIG. 9). The cup is therefore closed as its flap is in the raised position 35. When it passes in front of the indexing device 67, the cup receives a new coding, that is, one or more rods 51 are brought to their retracted position (I or X) under the effect of the effect of the electromagnet or electromagnets 68 which are excited in accordance with the code to be obtained. The retraction of the rods is possible, since the locking plate 64 is raised, in opposition to the action of the spring 65, by the ramps 62 of the rods which are subsequently locked in their contact position by the engagement of the plate 64 in the notches 61.

The corresponding flap 35 is held in its raised position by the core 46, since the other rods 51, which have not received a code, remain in their outer position and maintain the excitation circuit of the electromagnet 45 interrupted. The flap remains in this position until the moment when, in passing in front of the compartment which corresponds to the code recorded by the index unit 37, the rod or rods 51 which are in their outer position, such as that of the row II (FIG. 9), are returned by the ramp or ramps 66 of the device 38 to an intermediate position (such as that of the row III), which closes the corresponding contact.

If all the rods in the outer position, such as the position of the row II, are pushed back into the intermediate position, such as that of the row III, all the contacts 52, 53 are closed, the electromagnet 45 is excited and the cup is opened.

Consequently, if the compartment 6 corresponds to a given value of the code, the cup of each carriage—which cup pertains to a given operator station B—will open on condition that, firstly, at the station B the indexing device 67 has one or a plurality of electromagnets 68 excited, which push back one or a plurality of rods 51 to their extreme inner position and, secondly, the fixed device 39 in line with the compartment 6 in question comprises ramps 66 in line with all the rods which have not been depressed by the indexing device 67 (in other words, the ramps 66 must correspond to the unexcited electromagnets 68).

The opened cup is thereafter closed just before it reaches the upper return portion of the endless conveyor and the cycle is completed.

(b) *Operator Station B* (FIGS. 1–3 and 10–14)

As already mentioned, each station B is provided with an operator who reads one by one the addresses of the letters which pass before him in any order, and records for each address the corresponding code in the indexing device 67 by exciting one to ten of the electromagnets 68 which this device possesses. This coding operation will be explained in further detail hereinafter.

Each of these stations placed in front of the cabinet A is in the form of a desk. It is constituted by a casing having a rectangular plan shape and defined by four vertical walls, the walls 69 and 70 being parallel with the cabinet A and the walls 71 and 72 perpendicular to the cabinet A.

At its upper end, the casing is closed by an inclined wall 73 in which is provided a longitudinal channel 74 extending up toward the wall 72 in front of which the operator is positioned. This channel 74 is adapted to receive at $L^1$ (FIGS. 1, 2 and 10) packets of letters which are arranged haphazardly as concerns their destinations and must be filed in accordance with these destinations.

Each operator station B has its casing connected by a short connecting portion 75 to a longitudinal housing 76 which extends along the entire front wall 1 of the cabinet A at the base of the latter between the two end cases 9 and 10. Disposed in this housing, apart from the various electric conductors connecting the stations B to the indexing device 67, is a longitudinal transmission shaft 77 driven by the motor 14 of the endless conveyor, for example through the medium of an extension of the motor shaft and a pair of gears 78 (FIGS. 1 and 2). This longitudinal shaft drives a transverse shaft 80 in each station B by way of a pair of bevel gears 79. The shaft 80, which constitutes a first cam shaft of the station B, drives a second cam shaft 81 parallel with the shaft 80, for example by way of a chain 82 and sprockets 83 and 84 (FIGS. 10 and 14).

The two cam shafts 80 and 81 are shafts having a rhythmic movement in that they are driven by the motor 14 (or any other motor which would be in synchronous relation to the motor 14) at uniform speed which is independent of the speed and rhythm of the movements effected by the operator.

The transmissions between the cam shafts 80 and 81 and the motor 14 are such that these shafts effect exactly one rotation (360°) in the time T which the endless conveyor takes to move a distance corresponding to the pitch *p* defined hereinbefore as the distance a carriage must travel through to substitute any one of its cups 34 for the cup of the same row of the carriage which immediately precedes it. The direction of rotation of these shafts is unimportant, but once chosen, the various cams carried by these shafts are set in position accordingly.

Each station B comprises in its upper right part (FIG. 10) a third cam shaft 85 termed an arrhythmic rate shaft. This shaft is driven in such manner as to rotate equally in a uniform manner and to effect a complete rotation, but only each time the operator has effected a complete coding operation described hereinafter, which coding operation is effected at a variable rate depending on his operational speed.

This shaft 85 is driven in rotation by an electric motor and speed reducer unit 86 whose shaft 87 (FIGS. 10 to 12) is connected by a pair of gears 88 and 89 to an intermediate shaft 90. The latter can be connected to the cam shaft 85 by an electromagnetic clutch 91 (FIG. 11) whose coil 92 cooperates with a plate 93 keyed to the end of the shaft 85. This plate also cooperates with an electric brake 94 having a coil 95 which permits immobilizing the shaft 85 as soon as it ceases to be engaged by the clutch, as will be explained hereinafter.

The transmission between the shaft 85 and the motor 86 is such that this shaft 85, when engaged by the clutch, effects one rotation in a time $t$ which is equal to $kT$; T being, it will be recalled, the time the conveyor carriage takes to move through a distance corresponding to the pitch *p*, and $k$ a coefficient which is no more than one. If, for example, $T=0.9$ sec., $k$ could be equal to $\frac{2}{3}$ so that $t=0.6$ sec.

Each station B is provided with a keyboard 96 carried outside by the wall 72 in front of which the operator is positioned (FIGS. 1–3, 10, 11 and 12). The keyboard has keys 97, two of which the operator must depress successively to compose a code in the conditions explained hereinafter, as the letters to be sorted out pass before him and he reads off their addresses.

It will be recalled that these letters are deposited one behind the other at $L^1$ in the upper channel 74 of the station. Provided in this channel, which is capable of receiving, for example, a thousand letters, placed on edge one behind the other, is a device for moving the letters $L^1$ in the direction of the arrow $f^1$ (FIG. 10). This device consists of an endless conveyor having a plurality of chains 98 in parallel whose upper portions are located slightly below the base wall 99 of the channel. These chains pass round driving wheels or sprockets 100 keyed on a shaft 101 which is connected by a free-wheel arrangement 102 (FIG. 11) and a chain or other transmission 103 to a motor and speed-reducer unit 104. At their other ends, the chains 98 pass round wheels or sprockets 105 (FIG. 12). The letters $L^1$ are urged in the direction of arrow $f^1$ by thrust means 107 carried by the chains. The advance of the latter, obtained by supplying current to the unit 103, is controlled by a switch having a fixed stud 108 and a lever 109 (FIG. 12) which pivots at 110 and is urged against the stud 108 by a spring 111, so that the supply circuit is interrupted as soon as the upper end letter $L^2$ reaches the position shown in FIG. 12, in which it shifts the lever 109 away from the stud 108.

The first letter which is presented at $L^2$ is extracted from the stack of letters $L^1$ disposed one behind the other by an extracting device disposed in a case 112 at the upper end of the front wall 72 of the station B. This extracting device, which is actuated once in every rotation of the arrhythmic rate cam shaft 85 driven by the shaft 90, can be of any known type. It has therefore not been shown in detail. In the presently-described embodiment, it comprises a sucker 113 carried by a lever 114 which is pivoted about a horizontal axis by the action of a link 115 subjected to the opposing actions of a cam 116 having a boss keyed on the shaft 85 and of a return spring 117. This device therefore takes hold of the letter at $L^2$ and release it at $L^3$ in the upper part of the vertical passageway through which it falls.

This passageway is formed between two fixed walls 118 and 119 which are parallel with the wall 72. They are interrupted at 120 and continue at 121 in the form of two lower fixed extensions 122 and 123, the space between the parts 120 and 121 permitting the horizontal displacement in the direction of arrows $f^2$ and $f^3$ of a storing device C which stores the letters if the rate of work of the operator is too rapid and restores these letters as soon as this rate drops below the normal rate.

The upper part of the fixed passageway comprises three closing flaps 124, 125 and 126 situated at sufficient distances from one another to enable the largest letter to be sorted out to stop between these flaps by bearing against one of them. The upper flap 124 and the intermediate flap 125 are so controlled respectively, through the medium of rods 127 and 128 having return springs 129 and 130, by two cams 131 and 132 having a single boss mounted on the arrhythmic rate cam shaft 85, that these flaps swing to their open position once in each full rotation of this shaft.

The lower flap 126 is actuated by an electromagnet 133 once in each arrhythmic rate work cycle pertaining to the operator.

The lower portion of the passageway formed between the two extensions 122 and 123 of the fixed walls comprises two superimposed closing flaps 134 and 135 which are in such positions that each of them is capable of receiving a letter of the largest size. These flaps 134 and 135 are controlled at the rate of the uniform motion of the machine. To this end, each of them is actuated by a rod 136 and 137 biased by a spring 138 or 139 against a cam having a boss 140 or 141. These cams are keyed (FIGS. 10, 12 and 14) on the transmission shaft 80 which, it will be recalled, effects one rotation each time the conveyor carriage advances a distance corresponding to the pitch $p$ in the course of a period T.

As concerns the fixed part of the passageway just described, it should be added that the operator is able to see the address side of each letter which is stopped by the flap 125 owing to the fact that the corresponding portion of the wall 119 is constituted by a window 142. This window is wholly visible in the end of a recess 143 (FIGS. 3, 10 and 12) in the side of the station B facing the operator. The latter can therefore read off the addresses of the successive letters when each one of them is located at $L^4$ behind this window.

The storing device C which restores the letters disposed between the upper and lower portions of the fixed vertical passageway is constituted by an assembly of four vertical walls 146 which form therebetween three vertical hoppers 147, 148 and 149, the width of which is equal to that of the fixed vertical passageway. By the horizontal translation of the device C in the direction parallel with the phane of the FIGS. 10 and 12, any one of these three hoppers can be brought in line with the fixed passageway so as to ensure the continuity of this passageway between its upper and lower portions.

These hoppers are closed at their bases by flaps 150, 151 and 152 each of which is rigid as concerns rotatory motion with an individual lever. The three levers are designated by the reference numeral 153 and, depending on the transverse position of the device C, one of them co-operates with the core of a fixed electromagnet 154 which, in moving this lever upwardly, retracts or opens the corresponding flap, which is normally closed by the lever which acts as a counterweight.

The wall 146 nearest the wall 72 of the station B has at its lower end an auxiliary flap 155 controlled by a flap-opening electromagnet 156. This permits putting the hopper 149 in communication with a fixed container 157 provided at the base of the station B and from which any letter which falls therein can be, for reasons explained hereinafter, extracted manually through an opening 158 which is provided at the base of the wall 72 and is ordinarily closed by a door 159 (FIGS. 3, 10 and 12).

The moving assembly comprising the three hoppers 147, 148 and 149 and their flaps is moved in translation by the combined actions of two support and guide racks 160 and 161 which are rigid with the walls of these hoppers and are slidable in the frame of the station B, and two pawls 162 and 163 (FIGS. 12 and 6) provided at the ends of the cores 164 and 165 of two electromagnets having coils 166 and 167. Each of the two pawls comprises a ramp 168 or 169 (FIG. 16) which co-operates with a fixed pin 170 or 171 so as to engage it with its corresponding rack when the electromagnet 166 or 167 is excited.

The excitation circuits of the various electromagnets will be described hereinafter.

Each station is provided with conveying means which receives at $L^6$ (FIG. 12) at the base of the vertical passageway any letter released by the opening of the lower flap 135 (FIGS. 10 and 12), conveys it to and drops it into the cup 34 pertaining to the considered operator station B of one of the carriages 23 of the endless conveyor when this cup comes in line with this station in the plane D—D (FIGS. 2, 10 and 11) of symmetry of the vertical passageway and the conveying means.

This conveying means comprises an endless conveyor belt 172 (FIGS. 2 and 10–13) located below the flap 135 and supported by two rollers 173 and 174. The roller 174 drives the upper portion of the belt in the direction of the belt in the direction of arrow $f^4$, this roller being connected to the shaft 87 of the motor 86 through a chain 175 and sprockets 176 and 177, so that when a letter drops vertically onto the belt 172 at $L^6$ and is guided by the walls 122 and 123 (the flap 125 having been opened), this letter is fed a second conveyor which extends the first-mentioned conveyor.

This second conveyor comprises several pairs of endless belts 178 and 179 whose operative portions adjoin each other in the vertical plane D—D so as to continue to shift each letter engaged vertically between these operative portions in the direction of arrow $f^4$.

These pairs of belts are supported between two pairs of pulleys 180 and 181 whose axes are inclined. The pulleys 180 are driven in rotation by the pulley 177 of the conveyor 172 through the medium of a gear 182 in mesh with a gear 183 (FIGS. 13 and 14).

Located below the upper end of the second conveyor is a trough 184 whose base has an opening 185 which is so disposed as to direct any letter dropped therein by the belts 178 and 179 into the cup of the desired row, pertaining to the station B in question, of the carriage which passes at that instant below the trough.

(c) *Electromagnetic Devices and Their Electric Circuits*

Each of the keys 97 of the keyboard 96 controls the various electromagnetic devices and their circuits through the medium of a key relay E controlling various contacts.

The following will be examined in turn:

The control device of the key relays E.

The control device of the arrythmic cycle cam shaft 85 of each operator station B.

The regulation of the feed of the letters in the operator station B.

The temporary storage of the letters, if the rate of work of the operator is too high, and the restoring of these letters to the sorting out circuit.

The electromagnetic transcoding device of the emitted code.

The regulation and storage of the transcoded code in synchronism with the regulation and the storage of the letters.

($c_1$) *Control Device of the Key Relays (FIG. 15)*

Each key 97 of the keyboard of each operator station B is returned to its inoperative position of rest by a spring 186 as soon as it ceases to be depressed. It is connected to a switch 187 which is connected in series with a coil 188 of the relay E of the corresponding key. This coil is connected, for example, to the positive terminal (+) of a source of current, whereas the switch 187 is connected to the other terminal (−). The armature 189 of the relay E is adapted to actuate a series of contacts which will be described hereinafter and among these a re-feed or maintenance circuit contact 190. All the contacts 190 pertaining to the various relays E are connected to this second terminal (−) through the medium of a conductor 191 which is controlled by a switch 192. This switch is opened by a cam 193 (see also FIG. 11) in opposition to the action of a closing spring 194. This cam 193 comprises a single boss which is so set on the arrhythmic shaft 85 that, in rotating in the direction of arrow $f^5$, this cam opens only the general switch 192 at the end of one complete rotation of the shaft 85.

Thus, as soon as a key 97 is depressed, the corresponding relay E is excited by the switch 187 and then maintained excited when the key is released by the maintenance switch 190 until the end of one complete rotation of the shaft 85.

In this way, the memory of each depressed key is conserved in the form of the excitation of the corresponding relay (188, 189), so long as the shaft 85 has not opened the switch 192 at the end of one complete rotation.

($c_2$) *Control Device of the Arrhythmic Cycle Cam Shaft 85 (Lower Part of FIG. 15)*

It will be recalled that this shaft is braked when stationary by an electromagnetic brake having a coil 95, and can be coupled to the driving shaft 90 (FIG. 11) by an electromagnetic clutch having a coil 92 for the purpose of effecting a complete rotation in a time $t<T$.

These two coils 92 and 95 (FIG. 15), which are directly connected to one of the terminals (+) of the source of current, can be connected to the other terminal (−), alternately by a contactor 194 connected to this other terminal by a conductor 195. A spring 196 tends to maintain the lever of the contactor in the position for feeding the coil 95 of the brake electromagnet. To feed the coil 92 of the clutch electromagnet, there is provided an auxiliary relay F whose armature is connected to the lever of the switch 194, whereas the coil 197, to be excited, requires the successive depression of any two but different keys 97 of the keyboard, the coding being composed by this double depression, as will be explained hereinafter.

The coil 197 of the auxiliary relay F connected directly to one of the terminals (+) is connected to a conductor 198 that any one of a first series of contactors 199, controlled by the key relays E at the rate of one per key, permits connecting, by its closure, to a third conductor 200. The latter in turn can be connected to the conductor 195 by any one of a series of switches 201 which are controlled in the same way as the contactors 199 are by the key relays E.

Thus when all the keys 97 are in their inoperative positions of rest, the relay F is not excited and the spring 196 ensures through the medium of the switch 194 the feed of current to the brake coil 95 of the arrhythmic cycle shaft 85.

On the other hand, as soon as two keys are depressed, the corresponding key relays E reverse the switches 199 and 201 connected to their armatures and the relay F is excited, for example by way of the circuit $d$–197–$e$ . . . $i$–$j$ if the second and the last key 97 are actuated.

The coil 92 thus ensures the engagement of the clutch whereas the brake is released. The shaft 85 effects in the period of time $t$ one complete rotation in the direction of arrow $f^5$. At the end of this rotation, the cam 193, due to the opening of the switch 192, cease to excite the previously excited key relay E; their armatures are released and in returning the switches 199 and 200 to their positions of rest, they cease to excite the clutch electromagnet and once again excite the brake electromagnet. The shaft 85 therefore stops at the end of one complete rotation in such position that the boss of the cam 193 has once more just left the switch 192, which therefore once more closes and is ready for a further excitation of the key relays E.

($c_3$) *Device Regulating the Feed of the Letters in an Operator Station B. (FIG. 16)*

As will be recalled, the shaft 81 of each operator station B (FIG. 11) effects one rotation in the course of the period of time T corresponding to the movement through one pitch $p$ of the endless conveyor. Four pairs G, H, I, J of cams 202–203 (FIGS. 11 and 16) for instance are keyed on the shaft 81.

All these cams, which are assumed to rotate in the direction of the arrows (FIG. 16), have a single boss. The bosses 204 of the cams 202 are each so arranged as to close during a period of time equal to $$\frac{T}{4}$$

corresponding to a quarter of a rotation, two contacts 205, 206 (the contacts 206 are only concerned with the storage of the letters, described in detail hereinafter; further, these contacts are shown in the lower half of FIG. 16 in their actual positions in the circuits they control).

The bosses 204 of the cams 202 are angularly offset 90° from one another relative to the axis of the shaft 81 from the pair G to the pair J, so that these cams close their switches at instants $$T_0,\ T_0+\frac{T}{4},\ T_0+\frac{T}{2},\ T_0+\frac{3T}{4}$$

starting from the instant $T_0$ at the beginning of a cycle, that is, while each carriage substitutes one of its cups of a given row for the cup of the same row of the preceding carriage, each contact opening as the following contact closes.

The switches 205 connect in parallel the coils 207 of the four regulating relays $K^g$, $K^h$, $K^i$ and $K^j$ to a conductor 208 which is supplied with current through the medium of a switch 209 controlled by a cam 210 having a single closing boss. This cam 210 (FIG. 11) is keyed on the arrhythmic cycle shaft 85 which, it will be recalled, effects one complete rotation in the period of time $t<T$. The setting of the cam is such that it closes the switch 209 at the beginning of the rotation of the shaft 85 which rotation is caused, as explained hereinbefore, by the excitation of the clutch electromagnet and the de-excitation of the brake electromagnet following on two successive depressions of two different keys 97 of the keyboard which corresponds to an emission of the code.

The boss of the cam 210 has a short circumferential development so that the duration of the closure of the switch 209 is less than $$\frac{T}{4}$$

Known electrical or mechanical means, not illustrated, are provided to prevent the excitation of two consecutive regulation relays K for each rotation of the shaft 85, that is, for each coding operation effected by successive depressions of two keys of the keyboard.

Each regulation relay K for instance, consisting of the coil 207 and the armature 211 and excited by coincidence of the closures of the corresponding switch 205 and of mastic switch 209, and of an auxiliary switch 205$^a$ controlled by the preceding relay K, in order that it is closed only when said relay is not excited, so that it is impossible for two consecutive relays to be excited by rotation of shaft 85, that is to say for each coding operation (FIG. 16). Each relay is automatically re-fed by a conductor 212 through a switch 213 opened by the cam 203 of the same pair of cams and another switch 214 in series connected to the armature 211.

Thus it can be seen that for one cycle of the shaft 81 and a movement p of the conveyor between times $T_o$ and $T^1$—the cam 210 being regulated so as to close the switch 209 a very short time after the beginning of the rotation of the shaft 85 and the instant of the starting up of this shaft occuring in any one of the four intervals of time $$\left(T_o, T_o+\frac{T}{4}\right), \left(T_o+\frac{T}{4}, T_o+\frac{T}{2}\right),$$
$$\left(T_o+\frac{T}{2}, T_o+\frac{3T}{4}\right), \left(T_o+\frac{3T}{4}, T^1\right)$$

of a cycle of rotation of the shaft 85—a very short period of time after this starting of shaft 85 the cam 202 one of the pairs of cams G, H, I or J maintaining the corresponding switch 205 closed, the corresponding relay $K^g$ . . . $K^j$ is excited. It remains excited until the opening of the switch 213 by the cam 203 of the pair of cams whose cam 202 effected the excitation.

Consequently, excitation of any one of the relays K constitutes an electromagnetic memory of the position, at the instant of this excitation, of any cup relative to the position of this cup at the instant $T_o$, this distance being between O and $p/4$, $p/4$ and $p/2$, $p/2$ and $3p/2$ or $3p/2$ and $p$ following the instant of the starting up of the shaft 85, that is, that at which the coding operation was stopped by the operator, the latter having depressed two successive different keys of the keyboard.

In this example, four intermediate positions of a cup are thus memorized, but it will be understood that it is possible to memorize a greater or smaller number of intermediate positions of a cup, since it is sufficient to provide the same number of pairs of cams 202, 203 and the same number of relays K.

The electromagnets 133 and 154, which actuate respectively the flap 126 and that of the flaps 150, 151 or 152 of the moving storage device C (FIG. 12) which is situated, at the instant in question, in line with the vertical passageway, are fed through the medium of any one of the four regulation relays K ($K^g-K^j$) in the following manner (FIG. 16).

The coils of these electromagnets 133 and 154, which are connected directly to a terminal (+), are also connected to the other terminal (−) by one or the other of two conductors 215 and 216 and a common conductor 217 which is connected, for each regulation relay, to the conductors 215 and 216 by a common switch 218 closed by the excitation of the corresponding relay K and one or the other of two switches 219 and 220 which are in parallel and are controlled by cams 221 and 222 having a single boss.

Thus there are four pairs of cams 221, 222 keyed on the shaft 81 (FIG. 11) and their bosses are so set as to excite the electromagnets 133 and 154 at given instants, bearing in mind the staggering relative to the instant $T_o$ taken to be the origin of the rhythmic cycle of the precise instant when, the operator having composed the code, the shaft 85 starts to move.

From this instant on, which therefore occurs in one of the four intervals of time between the instants $T_o$ and $T_1$, the letters drop through the passageway of the corresponding station B under the following conditions (FIG. 12).

The shaft 85 starts to effect one rotation. As soon as it has rotated through the first few degrees, the cam 132 opens the flap 125 and the letter $L^4$—the address of which had been read off and codified by the operator by depressing two keys—drops successively onto the flap 126 and then onto the flap 150, for example, which flaps open successively—owing to the excitation of their electromagnets 133 and 154, and reaches the flap 134 and then the flap 135, which flaps are in turn opened successively, and with a certain advance relative to the passage of a cup at a fixed reference, by the action of the cams 140 and 141 so that the letter which falls onto the conveyor 172 is conveyed or fed by the latter and the conveyor (178—179) following the conveyor 172, toward the trough 184 (FIGS. 1–3, 13 and 14) through which it reaches at the right moment the cup of the row of one of the carriages which corresponds to that of the station B in question.

(c₄) *Device Controlling the Temporary Storage of the Letters and Their Restoration to the Sorting Out Circuit (FIGS. 16–19)*

It will be recalled that it is the moving storing device C which, by means of its three hoppers 147, 148, 149 and their flaps 150, 151, 152, ensures these operations under the control of three electromagnets 166, 167 and 156. Their excitation circuits, controlled by the regulation relays K (207, 211) and the second switches 206 controlled by the cams 202, are the following (at the bottom of FIG. 16).

The three electromagnets are connected to one of the terminals (+) of the source of current and a conductor 223 is connected to the other terminal. This conductor is connected, on the one hand, to a point M by contactors 224 in series, each of which is controlled by one of the regulation relays K, and on the other hand, to the coil 227 of a time relay N, by the set of contactors 224, auxiliary contactors 226 connected to the regulation relays K and the aforementioned switches 206, the contactors 224 and 226, the switches 206 and the conductors 228 and 229 interconnecting them being arranged as shown so that: when no regulation relay K is excited (corresponding to the illustrated position), the point M carries a current, and the time relay N is unexcited; in the course of the excitation of a single regulation relay K, the current is cut off from the point M and the time relay N is still unexcited; when the two regulation relays K are excited in the interval of time $T_o - T_1$ due to two rapid successive coding operations, the time relay N is excited and there appears, with a certain time delay, due to the delaying action of this relay, a voltage at the point O which is connected to the same terminal (−) of the source as the conductor 223 through a switch 230 closed by the excitation of the relay N.

The excitation circuits of the electromagnets 164, 165 and 156 are the following:

The electromagnet 164.—Its coil is directly connected to one of the terminals (+) whereas it is connected to the point O through a contactor 231 whose lever, which is biased by a spring 232 against the stud connected to the coil 166, can be separated mechanically by the rack 160 at the end of its travel toward the left, and a switch 233 actuated by a cam having a single boss 234 keyed on the rhythmic cycle cam shaft 81 (FIG. 11).

The electromagnet 165.—It is connected in a similar manner to the point M through a switch 235 actuated by the rack 161 at the end of its travel toward the right, and a switch 236 closed by a cam 237 keyed on the shaft 81 (FIG. 11).

Electromagnet 156.—It is connected to the point O through the aforementioned switch 233 and the contactor 231 at the end of the movement toward the left of the rack 160.

The storage and restoration of the stored letters is effected in the following manner:

The normal rate of work for the operator corresponds to one coding per rhythmic cycle, that is, in an interval of time T, such as $T_o - T_1$ for example. At this rate, no more than the regulation of the letters described hereinbefore occurs.

If the rate is higher, this signifies that a letter arrives in the vertical passageway that the machine cannot deal with, at any rate immediately. The point O is then put under tension by the excitation of the time relay N, the electromagnet 166 is excited, the storing device C is displaced transversely an extent corresponding to the width across a hopper and assumes the position shown in FIG. 17. A letter is retained at $L^8$ in the compartment or hopper 147.

If the rate once more becomes normal, the letter $L^9$ follows the normal path.

If the same conditions recur, the storing device C is once more shifted and assumes the position shown in FIG. 18; the second letter $L^9$ is then retained in the hopper 148; the storage device is full. At this moment the switch 231 is reversed by the abutment of the rack 160 against its switch lever, and, if the conditions mentioned hereinbefore recur, it is the electromagnet 156 which is excited.

The flap 155 opens (FIG. 19) and the third excess letter is discharged from the sorting out circuit into the compartment 157 where the letters thus eliminated are withdrawn from time to time and subsequently returned to the sorting out circuit.

The discharge of a letter would be furthermore very rare, since it implies that the operator works 1.5 times faster than the maximum speed, and in this case one letter out of five is discharged.

If, when the device C is in the position shown in FIG. 17 or 18 and, owing to a slowing down of the rate of work of the operator, the rhythmic rate shaft 81 effects one rotation without any coding operation, the current is supplied at M and the electromagnet 167 is excited. The storing device C returns to the extent of the width of one hopper toward the right and the or one of the stored letters is put back into the sorting out circuit. The cam 81 and the contact 236 control the moment of the return movement of the magazine. The contact 233 and the cam 234 control the moment of the forward movement. The switch 235 stops the return movement of the device C when it has returned to the normal initial position shown in FIGS. 12 and 16.

($c_5$) *Electromagnetic Code Translating Device (FIG. 20)*

This device is arranged for transforming or translating a coding operation, that is, a "value" of a code emitted by the manual depression of two keys 97 of the keyboard 96 into the "value" of a code having ten digits received by the machine and adapted to control the opening of the cups of the carriages, that is, a code whose different values are constituted by the various possible combinations of these ten digits each of which could have either of two conditions. More explicitly, these digits are constituted in the presently-described embodiment, firstly, in the fixed index means provided at the various operator stations B by the ten electromagnets 68 of the indexing devices 67 (FIGS. 1, 2 and 13), these electromagnets being excited (when operative) or unexcited (when inoperative) and, secondly, in respect of each cup 34 of each carriage 23 by the ten corresponding rods 51 of the index unit 37 (FIGS. 6, 7, and 9), these rods being in an inner retracted position (position I) or an outer position (position II).

The keyboard 96 could be, for example, of the alphabetic type and comprising 25 keys, each key being designated by a different letter. Of course the alphabet comprises 26 letters; however it has been found convenient in practice to dispose the keys 97 in the fashion of the keyboard of a typewriter, having 3 rows of keys for instance (as shown diagrammatically in FIGS. 2, 10, 11, 12). When three rows are used, the number of keys in the rows can be respectively 10, 8, and 7, the total number of keys being 25, according to the example selected. As the emission of a code is ensured by the successive depression of two different keys, the number of possible values of the code emitted by the manual coding operation is equal to the number of arrangements of twenty-five keys taken in pairs, namely $25 \times 24 = 600$.

The number of arrangements (600) can be further exemplified as follows: the *combinations*, two by two, of 25 elements such as for letters A, B, C, . . . etc. such combinations being for instance: AB or BA; alternatively AC or CA; but each of these pairs of elements counts only for one combination, in which the order of the elements which are combined does not matter. On the other hand, in the matter of arrangements, the order of the elements matters, and in that case combinations AB and BA constitute 2 different arrangements. Therefore, the coding possibilities are $25 \times 24$ or 600. The combinations of the 25 elements, pair by pair, would result in only 300 possibilities $$300 = \frac{(25 \times 24)}{2}$$

but this is different from the possibilities for the arrangements; therefore these possibilities (for the 2 different arrangements AB and BA) are, as stated $25 \times 24$ or 600.

In FIG. 20 the first two and the last two keys of the keyboard have been shown respectively at $97^a$, $97^b$ . . . $97^y$, $97^z$.

Each key is connected not only to the switch 187 (FIG. 15) controlling the key relays E but also (FIG. 20) to an opening switch $238^a$ . . . $238^z$ and to one or more closing switches $239^a$, $239^b$ . . . $239^z$.

The twenty-five switches $238^a$ . . . $238^z$ are connected in series between two points $240^a$ and $240^b$. With respect to the switches $239^a$ . . . $239^z$, they control the supply of current to the ten code relays $Q^1$–$Q^{10}$ each of which corresponds to one of the ten possible digits of the receiver code.

These ten relays are divided into two groups Y and Z respectively comprising the relays $Q^1$–$Q^5$ and relays $Q^6$–$Q^{10}$.

Each of these relays can have one of two states, that is, an excited state and an inoperative unexcited state, and each group can thus provide a number of combinations, this number being equal to $2^5 = 32$ so that for the two groups the number of possible combinations is $$32 \times 32 = 1024$$

If each one of the combinations of each of the groups Y and Z, is designated by one of 25 letters of the alphabet, twenty-five of the thirty-two possible combinations of each of the groups could be used, and if it is arranged that for each emission of a code the first key depressed acts on the first relay group X and the second key on the second group Y, the twenty five keys would permit obtaining out of 1,024 possible combinations of the ten relays Q a number of arrangements equal to $25 \times 24$ or 600. Indeed the cabinet A will provide for a lesser number of compartments 6, for example 300 compartments, and not all these possible combinations would be used.

The keys $97^a$ . . . $97^z$ of the keyboard are connected to the relays Q by the combination of the switches $239^a$ . . . $239^z$ and a reversing switch having two positions, and five contactors 240 actuated by the armature 241 of a switching relay R having a coil 242.

Contactors 240 connect—through the medium of the conductors 243 and 244 depending on the combinations to be obtained—the coils 245 of the code relays Q to the switches $239^a$ . . . $239^z$ which in turn connect them, through a conductor 246 and a switch 247 controlled by a cam 248 having a single boss on the shaft 85, to one of the terminals (−) of the source of current, the coils 245 being directly connected to the other terminal (+).

When they are excited, the relays Q close, through the medium of their armatures 249, the three switches 250, 251, and 252.

The switches 250 constitute the maintenance switches of the excitation of the relays after the keys have been released. They connect the coils 245 to the terminal (−) through a conductor 253 and a switch $254^a$, actuated by a cam 254 having a single boss and mounted on the cam shaft 85.

The switches 251 are connected in parallel between two conductors 255 and 256 and ensure the excitation of the switching relay R, one end of its coil 242 being connected directly to one terminal (+) whereas its other end is connected to the other terminal (−) by way of the conductor 256, one of the switches 251, the conductor 255, a conductor 257 connecting the conductor 255 to the conductor $240^a$–$240^b$, and the switch 247.

A maintenance switch 258 is provided between the conductors 256 and 246.

The ten switches 252 are adapted to interrupt the transmission of the code having ten digits, and their function will be explained hereinafter.

In their position of rest, the switches 247 and 254 are closed. When a key $97^a \ldots 97^z$ is depressed, and its switch 238 is opened, the circuit of the conductors $240^a$—$240^b$ is also opened. On the other hand, the corresponding group of contacts 239 is closed and the relay or relays Q of the first group X, combined with this key in accordance with the composed code, is or are excited and then maintained excited by their maintenance switches 250. Further, the switch or switches 251 of the excited relay or relays of the first group interconnect the conductors 255 and 256. When the key is released, its switch 238 is closed and re-establishes the circuit of the conductor $240^a$—$240^b$. A current therefore passes through the coil of the switching relay R which connects the contacts 239 of the keys to the code relays Q of the second group Y.

It has been seen, hereinbefore, that the depression of a key does not cause the shaft 85 to start to effect one rotation. It is therefore necessary to depress a second key to complete the value of the code and start the shaft 85 rotating.

The second key depressed opens its contact 238 but this has no effect, since the relay R is maintained excited by its maintenance contact 258.

The contact or contacts 239 of this actuated second key completes the value of the code emitted by the excitation of at least one relay Q of the second group Z, in view of the position assumed in the meantime by the switch.

The shaft 85 starts to rotate after the second key has been depressed, the contact 247 is opened by the cam 248 and this has for effect to de-excite the switching relay R. The latter relay resumes its initial position ready for a new coding. Then, a little before the end of its complete rotation, the cam 254 of the shaft 85 opens the switch $254^a$, which causes the de-excitation of the code relay or relays Q, which are maintained excited by their contacts 250, and the transcoder, constituted by the device just described, is ready for a new operation.

By way of example, it is clear from FIG. 20 that, assuming a vertical dash line represents an excited relay Q and a horizontal dash line the same relay when unexcited, the following table—which gives but a slight idea of the possible combinations—could be drawn up:

| Depressed key | Relays | | | | | | | | | |
|---|---|---|---|---|---|---|---|---|---|---|
| | $Q^1$ | $Q^2$ | $Q^3$ | $Q^4$ | $Q^5$ | $Q^6$ | $Q^7$ | $Q^8$ | $Q^9$ | $Q^{10}$ |
| $97^a$ | — | — | — | — | │ | | | | | |
| $97^b$ | | | | | | │ | │ | — | — | — |
| $97^a$ | — | — | — | — | │ | | | | | |
| $97^z$ | | | | | | | │ | — | — | — |

(c₆) *Electromagnetic Device for Regulating and Storing the Code After Transcoding (FIG. 21)*

This device complements, as concerns the code, the temporary storing device for the letters. As a code is emitted and transcoded as explained hereinbefore, by the successive depression of two keys—which results in the starting up the arrhythmic rate shaft 85 and the dropping of a letter in a given operator station B—it is necessary that the record of the transcoded value of the code emitted in the indexing device (67, 68) pertaining to this station be held back or stored, if the corresponding letter is stored in one of the hoppers 147, 148 of the storing device C, up to the moment when this storing device returns to its normal position and the letter is restored to the sorting out circuit.

Figure 21:
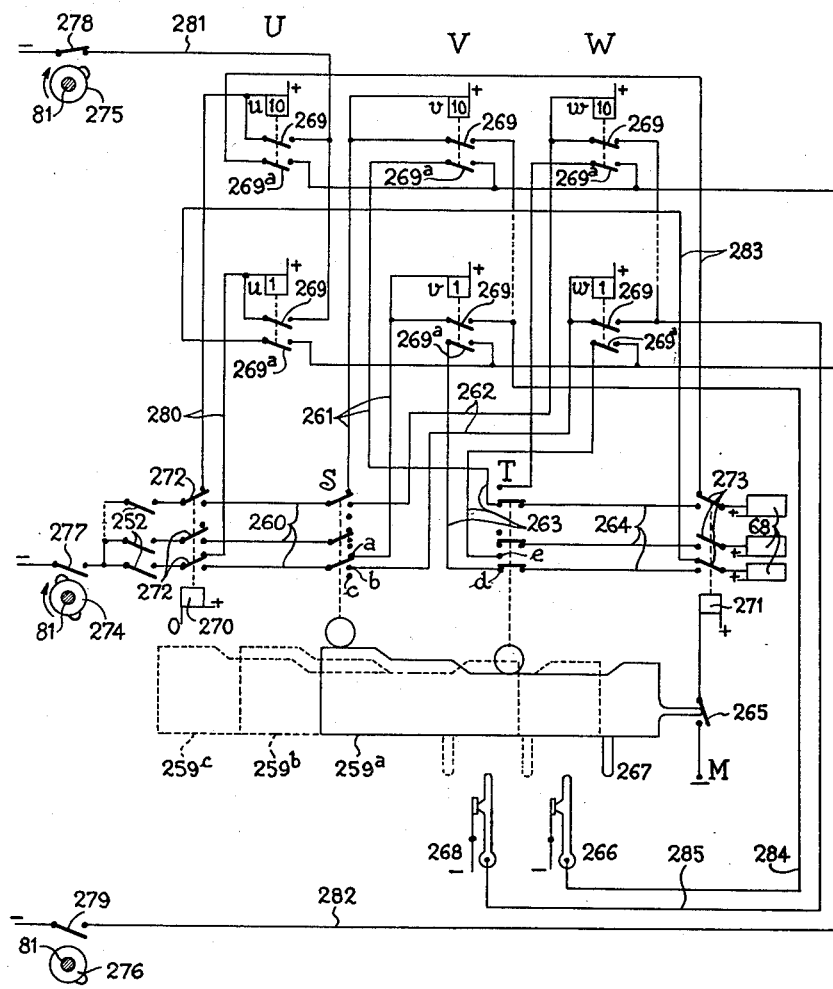
FIG. 21 is a similar diagram of the circuits for regulating and storing the code in electromagnetic form.
Figure 22:
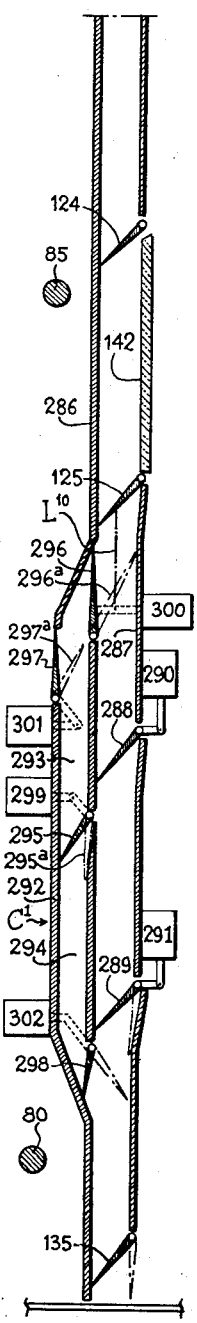
FIG. 22 is a view of a modification of the device regulating the feed of the letters or other documents.

A cam 259 is connected to the device C (FIGS. 10, 12 and 16), this cam moving with the device C and being therefore capable of occupying in succession any one of three positions $259^a$, $259^b$ or $259^c$ (FIG. 21).

This cam controls the following assembly of switches and contacts:

(a) A switch S having three positions and ten inputs 260 in parallel and two output conductors 261 and 262 for each input conductor (for the sake of clarity only a few input conductors have been shown); the positions a, b and c of the switch correspond to the positions $259^a$, $259^b$ and $259^c$ of the cam;

(b) A switch T having two positions d and e and ten inputs in parallel between the conductors 263 and 264; the position d of this switch corresponds to the positions $259^a$ and $259^b$ of the cam; its position e corresponds to the position $259^c$ of the cam;

(c) A contact 265 opened towards the position $259^a$ of the cam and closed for the other positions of the latter;

(d) An opening contact 266 controlled by a lug 267 of the cam which is so disposed that when the cam moves from the position $259^a$ toward the position $259^c$, the contact 266 remains closed, but when the cam moves from this position $259^c$ toward the position $259^a$, the contact 266 is opened a short instant in the course of the passage from the position $259^b$ to the position $259^a$ of the cam;

(e) A contact 268 controlled by the same lug 267, but opening in the course of the passage of the cam from the position $259^c$ to the position $259^b$.

The device further comprises:

(a) Three groups U, V, W of ten relays $u^1 \ldots u^{10}$, $v^1 \ldots v^{10}$, $w^1 \ldots w^{10}$, each of which has two closing contacts 269 and $269^a$.

(b) Two relays 270, 271 each of which is equipped with ten reversing contacts 272 or 273 and is respectively connected to the points O and M of the control circuits of the storing device C (FIG. 16), the first being connected directly and the second through the contact 265.

(c) Three cams 274, 275, 276 respectively actuating a closing contact 277, an opening contact 278 and a closing contact 279; these cams are fixed on the rhythmic rate shaft 81 (FIG. 11).

The cam 274 has two bosses, so that it is certain that at least one of them will close the contact 277 during the duration t of rotation of the arrhythmic shaft 85, since this cam effects a complete rotation during the time T which, in the numerical example, is equal to 0.9 sec., whereas t=0.6 sec. The contact 277 permits connecting one of the terminals (—) of the source of current—through the medium of the code switches 252 which are closed as explained hereinbefore by the excited code relays Q—either directly to the electromagnets u of the group U through the conductors 280 if the relay 270 is unexcited, that is, if there is no excess letter or, in other words, the rate of work of the operator is not too rapid, or to the conductors 260 of the contactor S if the point O carries current, that is, if a letter, and consequently a transcoded code, must be stored.

The cam 275 has a single boss and controls the switch 278 of the maintenance conductor 281 of the excited relay or relays u. Its boss is so disposed as to open the maintenance circuit a little before the end of one cycle of the shaft 81.

The cam 276 having a single boss closes the switch 279 a little before the opening of the switch 278 by the cam 275, puts under tension (terminal —) a conductor 282 which, through the switches $269^a$ of the closed relay or relays u, conductors 283 and the switches 273 of the unexcited relay 271, feeds the electromagnets 68 of the indexing device of the operator station B in question.

The foregoing circuits are completed in the following manner:

The conductors 261 leading from the contactor S feed the relays v when this contactor is in position a and the contactors 272 are in their lower position owing to the excitation of the relay 270, by the production of voltage at O (an excess letter will come).

The conductors 262 leading from the contactor S feed the relays *w* when this contactor is in position *b* (a second excess letter will come).

The conductors 263, which connect the contacts 269ª of the excited relays *v* or *w* to the conductor 282, close this conductor on the corresponding indexing electromagnets through the contactor T (in position *d*) by way of the conductors 264 and the contactors 273 in their lower position, when the relay 271 is excited by the production of a voltage at M (corresponding to the restoration of a stored letter).

The conductors 284 and 285 connect the maintenance switches 269 of the relays *v* and *w* to one of the terminals (−) through the contact 266 or 268.

It has been seen that each time an operator depresses two keys of the keyboard owing to the transcoding, a code having ten digits is produced by the closure of a number of contacts 252. These contacts are closed during a period of time a little shorter than the duration *t* of the cycle of the arrhythmic shaft 85 (that is, 0.6 sec. in the numerical example given hereinbefore).

When operating at normal rate, no current exists at O or M and the contacts 272 and 273 are therefore in the illustrated position. Consequently, the cam 275 having two bosses effecting at least one closure of the contact 278 during the closure of the contact or contacts 272, sends at least one electric pulse to each of the relays $u^1-u^{10}$ of the relay group U corresponding to the closed contact or contacts 252.

The excited relay or relays *u* are thereafter maintained excited owing to the closure of their contacts 269 until the opening of the contact 278 controlled by the cam 275.

A little before this opening, which is rhythmic, the contact 279 controlled by the cam 276 closes; a current pulse passes therefore through the contact 269ª of each of the excited relays *u* and excites the corresponding electromagnet 68 of the indexing device, since the relays 271 are at rest during normal operation of the machine (that is, during machine operation without storage or restoration of a letter or letters) as there is no current at point M.

Thus, it can be seen that in this case, any code having ten digits transcoded from the code emitted by the operator in an arrhythmic manner, is manifested by an excitation in a rhythmic manner of certain of the electromagnets 68 of the indexing device 67, namely those which reproduce this code.

When the operator emits a code corresponding to a letter which will be subsequently stored, it has been seen in the part of the foregoing description relating to the storage that a current is produced at the point O (FIG. 16). The effect of this current is to excite the relay 270.

Consequently, the closure of the contact 277, instead of actuating one or several relays *u* of the group U, actuates one or several relays *v* (the switch S still being in position *a*), since the movement of the cabinet C and of the cam from the position 259ª to the position 259ᵇ occurs with a certain delay relative to the above-mentioned operations as it is controlled by the cam 234 and the contact 233 (FIG. 16).

Thenceforth, any closure of the contact 279 by the cam 276 will continue to excite the electromagnets 68 of the indexing device in accordance with the codes recorded on the ten relays *u*, the codes recorded on the relays *v* not being translated on the indexing device unless the relay 271 is excited.

If a second letter is stored, it is the relays *w* which are excited, the cam assuming thereafter with a lag the position 259ᶜ.

If the operator continues to work at a rapid rate, it has been explained that the following letter is evacuated or discharged; the code will also be evacuated or discharged, since the position *c* of the switch S is without connections; the pulse due to the closure of the contact 279 will therefore be without effect.

If, on the other hand, the operator slows down his rate of work and a letter already in storage must be restored to the sorting out circuit, it has been explained (see the foregoing description of the storage) that a current is produced at point M.

At this moment, the contact 265 being closed and the cam being in position 259ᶜ, the relay 271 is excited and the electric pulse due to the contact 277 is transmitted through the contacts 269ª of the relays *w*, the switch T, the contacts 273 of the relay 271 and, finally, it is the code recorded on the relays *w* and corresponding to the letter which is then to be released, which will be transmitted to the electromagnets 68 of the indexing device.

The storing device C returns to its normal position (FIG. 17) after a certain delay, since it is controlled by the cam 237 and the contact 236 (FIG. 16).

When a new letter must be restored, the same procedure is repeated except that as the switch T is in position *d*, it will be the code of the relays *u* which is transmitted to the indexing device.

Each time a code is taken from the relays *v* or *w*, the storing device C, in moving shortly after toward the immediately lower position, opens the contacts 268 or 266 and the relays *w* and *v* are thus rendered inoperative, since it is these two contacts 268 and 266 which maintain their re-feed.

OPERATION OF THE MACHINE

Operation of the machine will be obvious from the foregoing description and is only briefly analyzed hereinafter.

The various operator stations B are supplied with unclassified letters at L¹ in their upper channels. The general driving motor 14 (FIGS. 1, 2) is supplied with current and the endless conveyor 11 imparts to the carriages 23 a continuous uniform movement of translation; each carriage travels the lower portion of the chain in front of the indexing devices 67 of the various stations, and then under the feed troughs 184 of these stations and finally successively above all the compartments 6 of the cabinet, the pitch *p* which separates two homologue cups 34 of two consecutive carriages being travelled through in the time T (0.9 sec.).

The cam shaft 81 of each station B rotates at constant speed and in a continuous manner and effects one complete rotation in T sec.

Each operator carries out the coding operations at an arrhythmic rate. He reads off the address of each letter presented behind the window 142 (FIG. 10) and—in accordance with the corresponding value of the pre-established code, which he of course knows by heart—he depresses two keys in succession.

If the rate of work of the operator is normal, the following results:

(*a*) The starting up for a uniform complete rotation in *t* sec. of the cam shaft 85, with the opening of the various flaps which permit the letter, whose address has just been read off by the operator, to drop into the vertical passageway, the cams 116 and 131 actuating the sucker 113 and the flap 124 ensuring at the end of the rotation the arrival of a new letter at L³ behind the window 142.

(*b*) The described transcoding and the excitation in accordance with the transcoded code of one or more electromagnets 68 of the indexing device 67 which indexes the index means of the cup pertaining to the considered station and to the carriage which is positioned before this indexing device a very short period after.

The letter released by the conveyor 178, 179 drops into this cup as the latter passes under the trough 184, and this cup conveys the letter to the required compartment 6 where it is deposited when the bottom of this cup opens in accordance with the code.

If the operator works at too high a rate, the storage of the letter or letters in excess and storage of their code and then the restoration thereof to the sorting out circuit, is effected in accordance with the procedure described hereinbefore.

Thus the machine conciliates in a precise manner the uniform and continuous operation of the cup conveyor with the irregular working rate of the operators.

MODIFICATION OF THE LETTER REGULATING AND STORING DEVICE (FIGS. 22-24)

According to this modification, there is provided a main vertical passageway for each operator station B. This passageway is continuous throughout its length and consists of two walls 286 and 287. It is divided by five superimposed flaps 124, 125, 288, 289 and 135. The portion of the wall 287 located between the flaps 124 and 125 is constituted by the window 142 for reading off the addresses of the letters. The flaps 124 and 125 are operated mechanically by the arrhythmic rate shaft 85 as in the first embodiment. The flaps 288, 289 are actuated by electromagnets 290, 291. The flap 135 is actuated by the shaft 80 as in the first embodiment.

Provided behind the wall 286 and extending along a part of its length, is a third wall 292 forming a storage device or magazine $C^1$ having two superimposed compartments or hoppers 293 and 294 separated by a flap 295. The upper hopper 293 can be made to communicate with the main passageway just below the flap 125 relating to the reading off of the addresses by a flap 296 which, in the position shown in full line, constitutes a part of the wall 286, whereas in the position $296^a$ shown in dot-dash line, it closes off the lower part of the main passageway just below the flap 125.

Further, the wall 292 comprises, just below the flap 296, another flap 297 which, in the position $297^a$ shown in dot-dash line, closes off the hopper 293 and permits evacuating any letter sliding on the flaps $296^a$ and $297^a$.

The lower hopper 294 communicates with the lower end of the main passageway by way of an opening controlled by another flap 298.

The flaps 295, 296, 297, 298 are controlled by electromagnets 299, 300, 301, 302 respectively.

Figure 23:
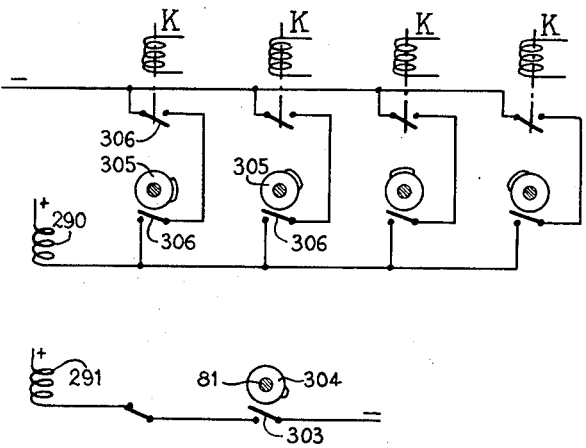
FIG. 23 is a circuit diagram pertaining to the regulation of the feed of the letters with the modification shown in FIG. 22.

The electromagnets 290, 291 controlling the flaps of the main passageway which control the descent of the letters at the normal rate, are controlled as shown in FIG. 23.

Each letter whose address is read off is coded by the operator in depressing the corresponding keys of the keyboard. It has been seen that the arrhythmic shaft 85 immediately starts to effect a complete rotation. A cam which is rigid with this shaft opens, as soon as the first degrees of rotation have been effected, the flap 125 and the letter drops onto the flap 288 and thence drops onto the flap 289 which opens before the passage of a cup in front of a fixed reference, so that this letter reaches at the right moment the charging device and then finally the considered cup. Owing to this, the electromagnet 291 controlling the flap 289 is excited by a contact 303 (FIG. 23) which is closed by a cam 304 fixed on the shaft 81 (see the first embodiment).

The flap 288 ensures the passage of the letter from the arrhythmic flap 125 to the ryhthmic flap 289 owing to the fact that the machine is responsive, through the engagement of one of the regulation relays K (see FIG. 16), to the delay between departure of a letter and the passage of a cup in front of the fixed reference.

Thus it is sufficient to have a group of four cams 305 each of which closes a contact 306, each of these cams being set for each possible delay between the departure of the letter and the start of a cycle T of the shaft 81, to solve the problem. Each relay K controls a contact 306 which is closed when the relay is excited and feeds the electromagnet 290 through the contact 306 of the corresponding cam.

For feeding the electromagnets 299, 300, 301, and 302 (FIG. 24) pertaining to the storage of the letters, there are provided the conductors 225, 228 and 229, the switches 206, the contactors 224 and 226 controlled by the regulation relays K, the time relay 227 and the points M and O of the diagram shown in FIG. 16.

It will be recalled that the point M carries current when no regulation relay K is excited; the point M no longer carries current when a single relay K is excited; the point O carries current when two relays K are excited in the time T owing to two coding operations within this lapse of time.

The electromagnet 300 is connected to the point O by the conductor 307 through a switch 321 actuated by a cam 318 keyed on the rhythmic shaft 81.

A switch 308 having a rotary element 309 is provided with three arms or poles 310, 311 and 312 representing three positions and capable of coming simultaneously in contact with studs $g$, $g^1$ or $g^2$, then $h$, $h^1$, $h^2$ and lastly $i$, $i^1$, $i^2$. The rotary assembly 309—312 is driven in rotation step by step in either direction by any known ratchet wheel and pawl device (not illustrated), for example by one or the other of two electromagnets 313, 314 which rotate it in the direction of arrow $f^6$ and in the opposite direction respectively.

Figure 24:
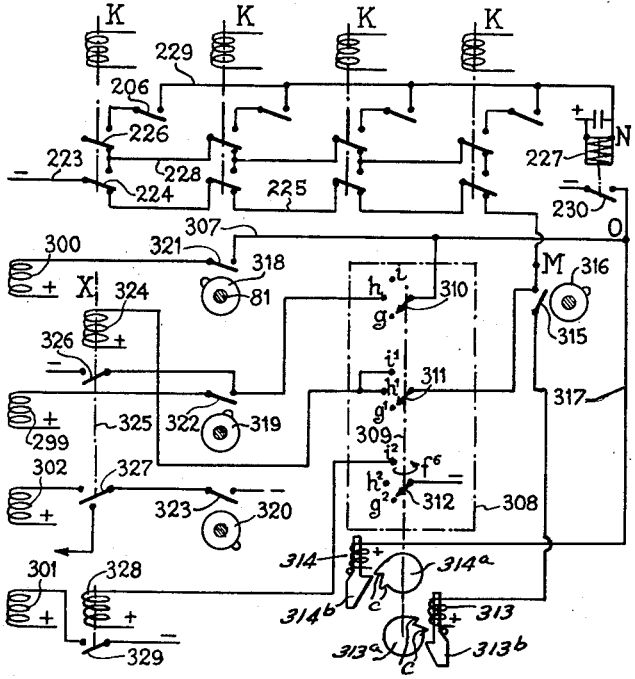
FIG. 24 is a circuit diagram relating to the temporary letter storage circuit.

With respect to the embodiment shown in FIG. 24, each ratchet wheel $313^a$ and $314^a$, carried by axle 309, has two teeth cooperating with the corresponding pawl $313^b$ or $314^b$ which is animated as usual with an alternative motion by electromagnets 313 and 314. On FIG. 24, these teeth are identified as "$t$." Thus, under the influence of electromagnet 313, and as the ratchet wheel rotates, the pawl is first in front of the forward tooth; then the pawl, having accomplished an alternate motion, comes in a second position between the two teeth; finally, after a second alternative motion, the pawl comes behind the rear tooth. The operation in the opposite direction is insured by means of electromagnet 314.

These electromagnets 313 and 314 are connected respectively to the point M, through a switch 315 controlled by a cam 316, and to the point O directly through the conductor 317.

The arm 310 is connected to the point O, the arm 311 to the point M and the arm 312 to the source of current (terminal —).

The assembly further comprises:

(a) The three aforementioned cams 318, 319, 320 closing the aforementioned switches 321, 322, 323, the four cams 316, 318, 319 and 320 being set on the shaft 81 in such relative positions as will appear from the operation described hereinafter.

(b) A relay X having a coil 324 and an armature 325 which, when excited, closes the two switches 326 and 327.

(c) A time relay 328 which, when excited, closes a switch 329.

The electromagnets 299, 300, 301 and 302 are fed in the following manner: they are connected directly to one of the terminals (+) of the source of current whereas their connection to the other connection (—) is ensured in the following manner: for the electromagnet 299, through the switch 322, the stud $h$ and the arm 311 connected to the point O of the switch 308, and through the switch 326; for the electromagnet 300, by the connection to the point O through the switch 321; for the electromagnet 302, through the switches 327 and 323 connected in series; and, for the electromagnet 301, through the switch 329. This modification of the letter storing device operates in the following manner:

When owing to an accelerated rate of work on the part of the operator, there are two closing operations in one revolution of the rhythmic shaft 81, that is, when there is an additional letter that the machine is incapable of receiving, the point O is connected to the terminal (—) by the time relay N, which permits closing the switch 230 for a rather long period of time, as the closure of one of the switches 306 can be very brief. The electromagnet 300 controlling the flap 296 is excited through the switch 321 closed by the cam 318. This flap moves to the position 296a and the letter, which arrives at L10, is deflected toward the hopper 293, since the responding time of the clutch of the arrhythmic shaft 85 causing opening of the address-reading flap 125 is longer than the time taken by the flap 296 to move to the position 296a. Further, the closure of the switch 230 causes the electromagnet 314 to carry current and this electromagnet causes the moving assembly of the switch 308 to pass from the position g, g1, g2 to the position h, h1, h2, which has for result to excite through the stud h the electromagnet 299 controlling the flap 295 in a given period of time controlled by the contact 322 of the cam 319.

If the operator continues to work at this accelerated rate, after several letters, two further operations will occur during one revolution of the rhythmic shaft 31. Once more, current will be produced at point O which will have for effect, on the one hand, to actuate the deflecting flap 297 by excitation of the electromagnet 300 and, on the other hand, to shift the moving assembly of the switch 308 from the position h, h1, h2 to the position i, i1, i2, and thus this time preventing excitation of the electromagnet 299, the flap 297 being pivoted to the position 297a by the excitation of the electromagnet 301 and the relay 328, but as the latter is slightly delayed or retarded, the pivoting of the flap 297 to the position 297a only occurs after the letter, which is deflected toward the hopper 293 by the flap 296 which pivoted to position 296a, has passed through the passage controlled by the flap 296. The letter is thus able to pass into the hopper 293 wherein it remains resting on the flap 295. Thus two letters are now in storage, one in the hopper 294 resting on the flap 298, and the other in the hopper 293 on the flap 295. Thenceforth, two things could occur:

(1) The operator maintains his accelerated rate of work; for each excess operation, the flap 296, in assuming the position 296a, deflects a letter which is evacuated or discharged by the flap 297 in position 297a; the electromagnet 314 is also excited, but the switch no longer moves in the opposite direction to arrow f6, since it has only three positions and two teeth "t," as shown on FIG. 24, in its ratchet wheel.

(2) The operator slows down his rate of work and, at a given moment, no operation occurs during one rotation of the shaft 81; a current is then produced at M. This current excites the relay X which closes the contacts 326 and 327. At an instant determined by the closure of the contact 323, controlled by the cam 320, the electromagnet 302 receives current; the flap 298 opens and the first letter stored in the hopper 294 is returned to the main sorting out circuit. A moment after, the cam 319, in closing the contact 322, causes, owing to the closure of the contact 326, current to be carried by the electromagnet 299, which shifts the flap 295 to the position 295a. The second letter stored resting on this flap drops onto the flap 298 and thus makes room for a future letter to be stored. After these various operations, the cam 316 closes the contact 315 which excites the electromagnet 313 and returns the moving assembly of the switch 308 from the position i, i1, i2 to the position h, h1, h2; the relay 328 is de-excited which interrupts the feed to the electromagnet 301; the flap 297 is returned to its vertical position, which enables a new letter to be stored. Depending on the rate of work of the operator, all the letters are restored to the sorting out circuit or a new letter is stored.

Although specific embodiments of the invention have been described, many modifications and changes may be made therein without departing from the scope of the invention as defined in the appended claims.

The various electromagnetic control devices could be replaced by any other equivalent devices, such as, for example, mechanical or electronic devices.

Having now described my invention what I claim as new and desire to secure by Letters Patent is:

1. In a machine for sorting out letters and like documents in combination: a single endless distributing conveyor (11), driving means (14, 9) for imparting to the conveyor (11) a continuous uniform motion in one direction several identical carriages carried by said conveyor and disposed at equal distance from each other, a plurality of cups carried in rows behind each other by said carriages, the number of said cups being the same for all carriages, all said cups being identical and being capable of being indexed and each cup being adapted for the individual conveyance of a document (L) to be sorted out, a number of operator stations, said number being equal to the number of cups in each carriage, all said carriages passing in front of said stations, a cup in a given row of each carriage cooperating with a given and definite one of said operator stations, each of said operator stations comprising: a sorting out circuit in which each of said documents moves so as to be received by a cup, a keyboard (96) having keys (97) actuated by the operator, an indexing device operatively connected to the keyboard for permitting the operator, by actuation of different keys of the keyboard, to direct each of said documents through the sorting out circuit (L- toward a cup (34) and to index the cup, a regulating device (C) regulating the feed of the documents toward the cups (34) so as to conciliate the arrhythmic rate of the operations of the operator with the continuous and uniform advance of the conveyor (11) by the temporary storage outside the sorting out circuit of at least one document if the arrhythmic rate of work of the operator is momentarily higher than his normal rate and, inversely, by the restoration of the document to the sorting out circuit as soon as the rate of the operator drops below said normal rate, and means constituting a memory for storing and thereafter restoring the value of the code emitted by the operator for the document, whereby the cup (34) which receives the doument after the restoration of the latter to sorting out circuit is indexed.

2. In a machine for sorting out letters and other documents (L), in combination: a single endless conveyor (11) to which is imparted a uniform and continuous motion of advance, several identical carriages carried by said conveyor and disposed at equal distance from each other, a plurality of cups carried in rows behind each other by said carriages, the number of said cups being the same for all carriages, all said cups being identical and being capable of being indexed, each cup being adapted for the individual conveyance of a document (L) to be sorted out, a number of operator stations, said number being equal to the number of cups in each carriage, all said carriages passing in front of said stations, a cup in a given row of each carriage cooperating with a given and definite one of said operator stations, each of said operator stations comprising: a keyboard actuated by the operator, an upper receiving and feeding device for a series of said documents, a vertical passageway provided with a viewing window, a device actuated by the keyboard for taking hold of the documents in the receiving and feeding device one by one and causing them to pass through the passageway behind the window, in front of the eyes of the operator who reads off or otherwise identifies the destination, a regulating device (C or C1) disposed below the window for regulating the feed of the documents (L) toward the cups and conciliating the arrhythmic rate of the operations of the operator with the continuous and uniform advance of the conveyor (11) by temporarily storing outside the passageway at least one document if the arrhythmic rate of the operator is momentarily higher than his normal rate and, inversely, restoring the document to the passageway as soon as the rate of the operator drops below said normal rate, and means constituting a memory for storing and thereafter restoring the value of the code emitted by the operator for said document whereby the cup which subsequently receives the document after restoration of the latter is indexed.

3. Machine as claimed in claim 2, comprising at the base of the passageway under the regulating device C or $C^1$ at least one conveyor (172) for receiving each document and feeding the latter to one of the cups of the endless conveyor at the moment when the cup passes in front of the operator station.

4. In a machine for sorting out letters and other documents, a number of operator stations (B) each being provided with a regulating device (C or $C^1$) which permits a temporary storage of at least one document and which comprises in combination with a passageway through which the documents pass, a magazine constituted by a number of juxtaposed hoppers (147—149 or 292, 293) and transversely and horizontally movable between an upper portion and a lower portion of said passageway which is fixed, each of said hoppers having a horizontal section which is substantially identical to that of the passageway, and means (160, 171 or 296, 298) for directing the excess documents of the passageway toward the magazine, said means being adapted to ensure the lateral, horizontal movements of said magazine in either direction for placing each hopper in front of an excess document coming from said upper portion of said passageway and restoring said document to said lower portion of said passageway when the arrhythmic rate of the operator slows down.

5. Machine as claimed in claim 4, wherein the magazine (C) is connected to two racks (160, 161) whose transverse directions are opposite and which co-operate with driving pawls (162, 163), electromagnets (166, 167) being provided for actuating the pawls.

6. Machine as claimed in claim 4, wherein the magazine ($C^1$) of the regulating device comprises, on one side of the fixed passageway, a plurality of superimposed hoppers (293, 294), at least one retractable flap (295) for separating said hoppers into pairs, an upper deflecting flap (296) which permits, depending on its position, deflecting each document either into the upper hopper (293) or toward the lower part of the passageway according as the document is an excess document or is not an excess document, and a lower flap (293) controlling the communication between the lower hopper (294) and the passageway for, upon the opening of the lower flap, ensuring the return one by one of the stored documents to the passageway.

7. Machine as claimed in claim 6, comprising electromagnets (299 and 302) for controlling said flaps (295, 296, 298).

8. Machine as claimed in claim 4, comprising an auxiliary flap (155 or 297) for discharging out of the sorting out circuit any document which is an excess document when the magazine (C or $C^1$) is full.

9. In a machine for sorting out letters and other documents, in combination: an endless conveyor (11) a plurality of carriages carried by said conveyor and spaced equally from each other, a plurality of cups carried in rows behind each other by said carriages and capable of being indexed and driven with a continuous and uniform motion, and a number of operator stations, said number being equal to the number of cups in each carriage, each cup of one of said carriages cooperating with a given and definite one of said operator stations and passing in front of said station, each operator station comprising: a keyboard (96) having keys (97) and combined with means which permits the operator to direct each document separately toward a cup and to index the cup in accordance with the destination of the document, a regulating device (C or $C^1$) which permits a temporary storage of at least one document if the arrhythmic rate of the operations of the operator is higher than the rhythmic rate of motion of the cups, and actuating means for actuating the regulating device, said actuating means comprising at least a first rotary shaft (81) to which a continuous rotary motion is imparted in synchronism with the conveyor (11) having the cups (34), and a second arrhythmic rate rotary shaft (85) which effects a complete rotation at uniform motion with a period ($t$) less than that (T) of the first shaft, but at an arrthythmic rate corresponding to the rate of the operations of the operator, said shafts (81, 85) being combined with devices for acting on the regulating device (C or $C^1$) in accordance with the cycles of rotation of the two shafts (80, 81) with respect to time.

10. Machine as claimed in claim 9, wherein the arrhythmic rate shaft (85) is combined with the keyboard (96) having keys (97) by the manual actuation of the keys by the operator in such manner that the arrhythmic rate shaft (85) is driven in rotation for one rotation when the operator depresses two different keys (97) of the keyboard in succession so as to emit a value of the index code.

11. Machine as claimed in claim 10, comprising, for driving the arrthythmic rate shaft (85), an electric motor speed-reducer unit (86—89), a clutch connecting said unit to the shaft, and a brake on the latter, the clutch and the brake being controlled electromagnetically by the keys (97) of the keyboard.

12. Machine as claimed in claim 11, comprising, for the electromagnetic control of the clutch and the brake, a reversing switch (194) disposed in the excitation circuits of the clutch and the brake, an auxiliary relay (F) and a spring (196) for acting in opposition on the reversing switch, the relay (F) ensuring by its excitation clutch engagement, key relays (E) for controlling the supply circuit of the auxiliary relay (F) and disposed in parallel in such manner that there is one key relay for each key (97), and reversing switches (199, 201) controlled by the key relays and so combined that the auxiliary relay (F) is only excited when two key relays (E) are themselves excited.

13. Machine as claimed in claim 11, wherein the means for actuating the regulating device (C) comprise electromagnets (166, 167) and control switches (224, 276, 206) disposed in the excitation circuits of the electromagnets, said electromagnets being controlled by electromagnetic means which comprise a number of regulation relays ($K^g$–$K^j$) whose excitation circuits comprise for their control, on the one hand, a common switch (209), a cam (201) driven by the arrhythmic rate shaft (85) ensuring the control of said common switch, and, on the other hand, switches (205) connected in series with the common switch (209) and each provided for the excitation circuit of one relay, whereas the maintenance circuits of said relays comprise not only the usual maintenance switches (214) but also auxiliary switches (213) connected in series with the usual switches (214), the excitation switches (205) and the auxiliary switches (213) relating to each relay being combined with two actuating cams (202, 203) driven in rotation by the shaft (81) to which a uniform continuous motion is imparted, the cams (202) relating to the excitation switches (205) being so arranged that in the course of one cycle of the last-mentioned shaft (81), the relays (K) can be excited one after the other without delay therebetween, a single relay (K) being capable of being excited only for each full rotation of the arrhythmic rate shaft (85), said relays and said key relays being connected to said switches (224, 226 and 206) disposed in the excitation circuits of the electromagnets (166, 167) controlling the regulating device (C), whereby a document is stored each time two regulation relays (K) are excited for each rotation of the shaft (81) having a continuous rotation owing to two consecutive rotations of the arrhythmic rate shaft (85), whereas a document is restored to the sorting out circuit when no relay (K) is excited owing to non-rotation of the arrhythmic rate shaft (85).

14. In a machine for sorting out letters or other documents, a number of operator stations (B) each comprising a keyboard having alphabetic keys (97ª), a coding device (FIG. 20) adapted to effect a transcoding from the keyboard in a code having $n$ (for example ten) digits, and means (252, 259 to 280, FIG. 21) including an electromagnetic device and a first switch, each key being connected to a second set and a third set of switches combined with coding relays having armatures, said first switch storing the transcoded code being connected to the armature of each of said coding relays, said means constituting a memory and adapted to store and restore the values of the transcoded code.

15. Machine as claimed in claim 14, wherein each key ($97^a \ldots 97^z$) of the keyboard is connected to a fourth set of opening switches and to a fifth set of closing switches, said fourth and fifth sets being combined, on the one hand, with a sixth switch (240, 241) having $n/2$ poles and two positions and, on the other hand, with $n$ coding relays ($Q^1 \ldots Q^{10}$) which are divided into two groups ($Q^1 \ldots Q^5, Q^6 \ldots Q^{10}$) in such manner that two successive depressions of the same key ensure, the first depression, the excitation of one or more relays of the first group and, the second depression, the excitation of one or more relays of the second group.

16. Machine as claimed in claim 14, comprising a movable storing magazine for temporarily storing at least one document, a cam (259) unitary with the magazine as concerns the movements of the latter, two contactors (S and T) controlled by the cam (259), three groups (U, V, W) of $n$ relays ($u, v, w$) the feed to which is controlled by said contactors (S and T), through said switches (252) controlled by the coding relays (Q), an indexing device (67) and indexing electromagnets (68) for the indexing device controlled by the relays ($u$) of the first group (U), whereas the relays ($v$) of the second group (V) and those ($w$) of the third group (W) retain the memory of the transcoded coding or codings to be stored for restoration thereof to the index electromagnets (68) when the magazine (C) returns to the position thereof corresponding to the normal rate of work of the operator.

References Cited in the file of this patent

UNITED STATES PATENTS

| | | |
|---|---|---|
| 2,670,087 | Stehlik | Feb. 23, 1954 |
| 2,677,473 | Piggott | May 4, 1954 |
| 2,689,657 | Lens | Sept. 21, 1954 |
| 2,717,086 | Bush | Sept. 6, 1955 |
| 2,812,079 | Carnine | Nov. 5, 1957 |
| 2,923,420 | Dyer | Feb. 2, 1960 |

FOREIGN PATENTS

| | | |
|---|---|---|
| 528,189 | Great Britain | Oct. 24, 1940 |